US011455028B2

United States Patent
Uhm et al.

(10) Patent No.: US 11,455,028 B2
(45) Date of Patent: Sep. 27, 2022

(54) METHOD FOR PROCESSING DATA AND ELECTRONIC DEVICE FOR SUPPORTING SAME

(71) Applicant: Samsung Electronics Co., Ltd., Gyeonggi-do (KR)

(72) Inventors: Junwhon Uhm, Gyeonggi-do (KR); Nari Kim, Gyeonggi-do (KR); Mincheol Seo, Gyeonggi-do (KR); Jaehyuk Lee, Gyeonggi-do (KR); Sungchul Park, Gyeonggi-do (KR); Jiyoon Park, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/891,225

(22) Filed: Jun. 3, 2020

(65) Prior Publication Data
US 2020/0379550 A1     Dec. 3, 2020

(30) Foreign Application Priority Data
Jun. 3, 2019   (KR) ........................ 10-2019-0065288

(51) Int. Cl.
*G06F 3/01*     (2006.01)
*G02B 27/01*     (2006.01)
(Continued)

(52) U.S. Cl.
CPC .......... *G06F 3/011* (2013.01); *G02B 27/0101* (2013.01); *G06F 1/3212* (2013.01); *G06T 7/70* (2017.01); *G02B 2027/014* (2013.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 8,451,314 B1 *   5/2013   Cline ..................... G16H 40/67
                                                                          348/14.08
9,375,143 B2     6/2016   Matsuno et al.
(Continued)

FOREIGN PATENT DOCUMENTS

EP           3229536 A1     10/2017
JP           2016-6589 A     1/2016
(Continued)

OTHER PUBLICATIONS

International Search Report dated Sep. 11, 2020.
European Search Report dated May 24, 2022.

*Primary Examiner* — Todd Buttram
(74) *Attorney, Agent, or Firm* — Cha & Reiter, LLC

(57) ABSTRACT

An electronic device according to certain embodiments may include a communication circuitry; a camera; a display; a sensor; and at least one processor operably connected to the communication circuitry, the camera, the display, and the sensor, wherein the at least one processor is configured to: acquire an image through the camera; acquire, through the sensor, information on a position and a orientation of the electronic device; select, from among the electronic device and an external electronic device, a selected electronic device to produce a virtual image related to the image; when the selected electronic device is the external electronic device transmit, through the communication circuitry, the information on the position and the orientation of the electronic device and the image to the external electronic device; receive, through the communication circuitry, the virtual image; and display the virtual image through the display.

14 Claims, 9 Drawing Sheets

(51) Int. Cl.
*G06T 7/70* (2017.01)
*G06F 1/3212* (2019.01)

(58) Field of Classification Search
CPC .... G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 10,416,835 | B2 | 9/2019 | Chu et al. |
| 10,607,409 | B2* | 3/2020 | Troy ................. G06T 15/20 |
| 10,841,174 | B1* | 11/2020 | Ely ..................... H04W 76/14 |
| 2007/0300188 | A1* | 12/2007 | Kim ................. H04N 5/44513 715/835 |
| 2012/0092715 | A1* | 4/2012 | Kamei ................. G06F 3/1289 358/1.15 |
| 2012/0194550 | A1 | 8/2012 | Osterhout et al. |
| 2014/0300775 | A1* | 10/2014 | Fan .................... H04N 1/32128 348/231.3 |
| 2015/0062114 | A1* | 3/2015 | Ofstad ................ G06F 3/04842 345/419 |
| 2015/0170422 | A1 | 6/2015 | Aoyama et al. |
| 2015/0373274 | A1 | 12/2015 | Kuwabara et al. |
| 2016/0110152 | A1* | 4/2016 | Choi ...................... G09G 5/006 345/2.3 |
| 2016/0238852 | A1 | 8/2016 | Ellsworth et al. |
| 2017/0011706 | A1 | 1/2017 | Namkung et al. |
| 2017/0214945 | A1* | 7/2017 | Chang .................... H04W 4/80 |
| 2018/0075662 | A1* | 3/2018 | Cho ......................... B60R 1/00 |
| 2018/0249062 | A1* | 8/2018 | Jin ........................ G06F 3/011 |
| 2018/0268241 | A1* | 9/2018 | Nakayama ............... G06K 9/03 |
| 2019/0015045 | A1 | 1/2019 | Li |
| 2019/0096023 | A1 | 3/2019 | Diefenbaugh et al. |
| 2019/0155372 | A1 | 5/2019 | Cuervo et al. |
| 2019/0221029 | A1* | 7/2019 | Yoneda .................. G06T 15/20 |

FOREIGN PATENT DOCUMENTS

| | | |
|---|---|---|
| JP | 5884816 B2 | 2/2016 |
| JP | 2016-224632 A | 12/2016 |
| KR | 10-2016-0150565 A | 12/2016 |
| KR | 10-2017-0006058 A | 1/2017 |
| KR | 10-2017-0055296 A | 5/2017 |
| KR | 10-2141596 B1 | 8/2020 |
| WO | 2018/073584 A1 | 4/2018 |
| WO | 2018/200993 A1 | 11/2018 |

* cited by examiner

METHOD FOR PROCESSING DATA AND ELECTRONIC DEVICE FOR SUPPORTING SAME

CROSS-REFERENCE TO RELATED APPLICATION(S)

This application is based on and claims priority under 35 U.S.C. 119 to Korean Patent Application No. 10-2019-0065288, filed on Jun. 3, 2019, in the Korean Intellectual Property Office, the disclosure of which is herein incorporated by reference in its entirety.

BACKGROUND

1) Field

Certain embodiments relate to a method for processing data and an electronic device for supporting same.

2) Description of Related Art

In order to provide enhanced user experience, an electronic device can provide augmented reality.

An augmented reality service may be a service for providing a virtual image including supplemental information related to an external object present in a real world.

The above information is presented as background information only to assist with an understanding of the disclosure. No determination has been made, and no assertion is made, as to whether any of the above might be applicable as prior art with regard to the disclosure.

SUMMARY

An electronic device according to certain embodiments may include a communication circuitry; a camera; a display; a sensor; and at least one processor operably connected to the communication circuitry, the camera, the display, and the sensor, wherein the at least one processor is configured to: acquire an image through the camera; acquire, through the sensor, information on a position and a orientation of the electronic device; select, from among the electronic device and an external electronic device, a selected electronic device to produce a virtual image related to the image; when the selected electronic device is the external electronic device transmit, through the communication circuitry, the information on the position and the orientation of the electronic device and the image to the external electronic device; receive, through the communication circuitry, the virtual image; and display the virtual image through the display.

A method according to certain embodiments comprises acquiring an image through a camera of an electronic device; acquiring, through a sensor of the electronic device, information on a position and a orientation of the electronic device; selecting, from among the electronic device and an external electronic device, a selected electronic device to produce a virtual image related to the image; when the selected electronic device is the external electronic device transmitting, through a communication circuitry of the electronic device, the information on the position and the orientation of the electronic device and the image to the external electronic device; receiving, through the communication circuitry, the virtual image from the external electronic device; and displaying the virtual image through a display of the electronic device.

An electronic device according to certain embodiments comprises a communication circuitry; a camera; a display; a sensor; and at least one processor operably connected to the communication circuitry, the camera, the display, and the sensor, wherein the at least one processor is configured to: acquire an image through the camera; acquire, through the sensor, information on the position and the orientation of the electronic device; determine whether or not to produce a virtual image related to the image with an external electronic device connectable to the electronic device; when it is determined to produce the virtual image with the external electronic device transmit, through the communication circuitry, the information on the position and the orientation of the electronic device and the image to the external electronic device; receive, through the communication circuitry, the virtual image from the external electronic device; and display the virtual image through the display.

BRIEF DESCRIPTION OF THE DRAWINGS

The above and other aspects, features, and advantages of certain embodiments will be more apparent from the following description taken in conjunction with the accompanying drawings, in which.

In relation to the description of the drawings, an identical or similar reference numeral may be used for an identical or similar element.

DETAILED DESCRIPTION

An electronic device (for example: a head-mounted display device) can perform an operation of producing a virtual image for providing an augmented reality service. While producing a virtual image, the electronic device may consume considerable power, and the temperature of the electronic device may increase.

Certain embodiments relate to a method for processing data and an electronic device for supporting same, which may perform an operation of producing a virtual image through an electronic device or an external electronic device according to various information.

An operation of producing a virtual image through an electronic device or an external electronic device according to various pieces of information may be performed, so as to reduce power consumption, reduce the weight of an electronic device, and reduce power for wireless communication, so that an influence on a human body may be reduced.

In addition, an operation of producing a virtual image through an electronic device or an external electronic device according to various pieces of information may be performed, so as to reduce heating and reduce power consumption of an electronic device, so that the duration of use of an electronic device may be increased.

The technical tasks which the disclosure is to achieve are not limited to the above-mentioned technical tasks, and other technical tasks not mentioned will be clearly understood from the following description by those skilled in the art to which the disclosure belongs.

Figure 1:
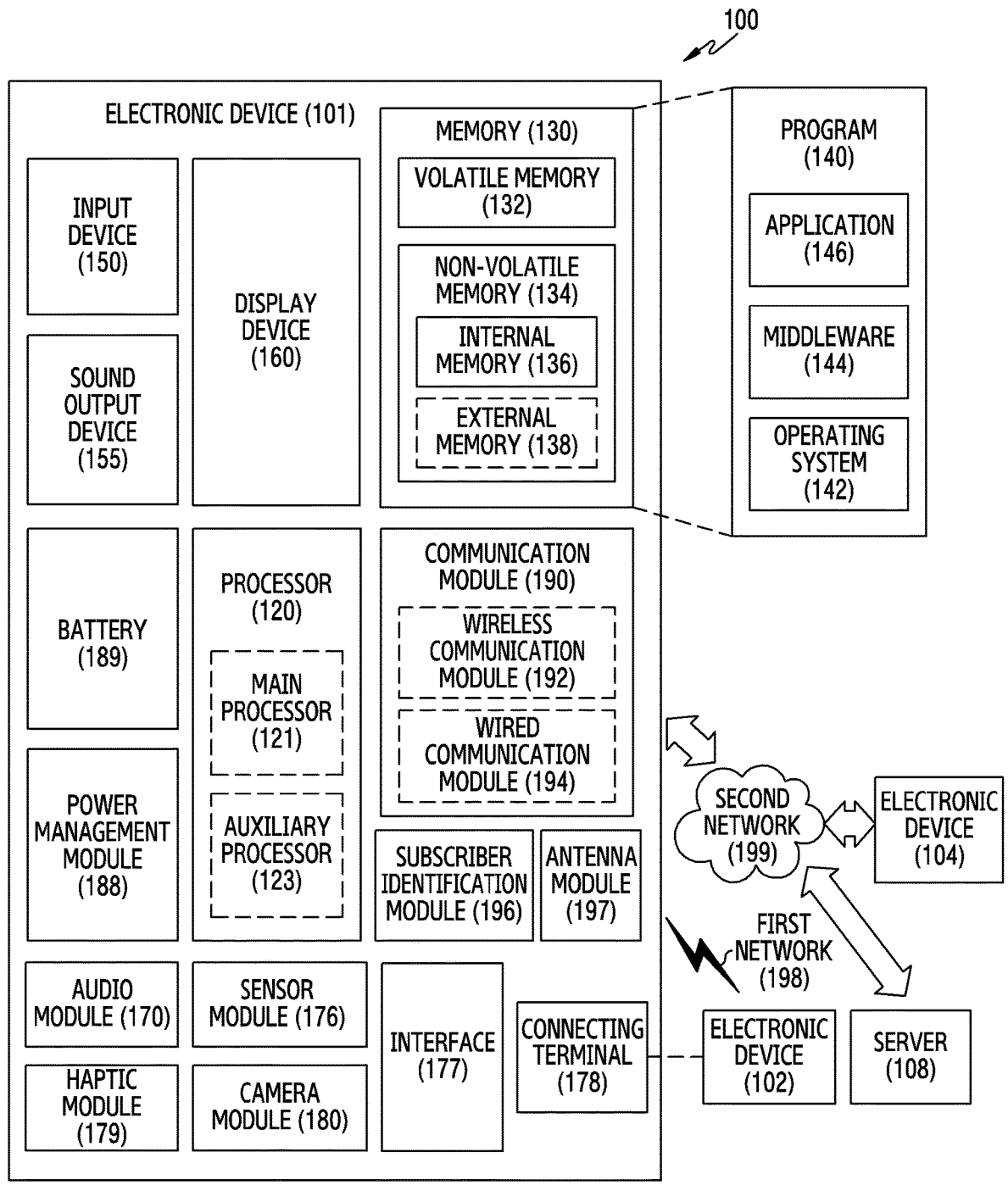
FIG. 1 is a block diagram of an electronic device in a network environment, according to certain embodiments.

FIG. 1 is a block diagram illustrating an electronic device 101 in a network environment 100 according to certain embodiments. The electronic device 101 can take a picture using a camera and can select either the electronic device 101, itself, or an external electronic device.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

Hereinafter, "processor" shall be understood to include both the singular and plural content.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

In certain embodiments, an electronic device, such as electronic device 101 can be used to provide a virtual image based on an image captured by camera module 180 and display the virtual image on the display 160. However, the electronic device 101 may consume a large amount of power to produce the virtual image which can drain the battery 189 or heat the electronic device 101. Accordingly, the electronic device 101 can use a sensor module 176 to determine the charge level of the battery 189 or the temperature of the electronic device 101. In certain embodiments, based on the foregoing, the electronic device 101 can select the electronic device 101 or an external electronic device, such as electronic device 102 to produce the virtual image.

In certain embodiments, the electronic device 101 can determine a first communication state between the electronic device 101 and the electronic device 102 using the first network 198 and a second communication state between the electronic device and the electronic device 102 and a second network 199 to a server 108. Based at least in part thereon, the electronic device 101 can select from among the electronic device 101 and electronic device 102 for producing the virtual image.

Figure 2:
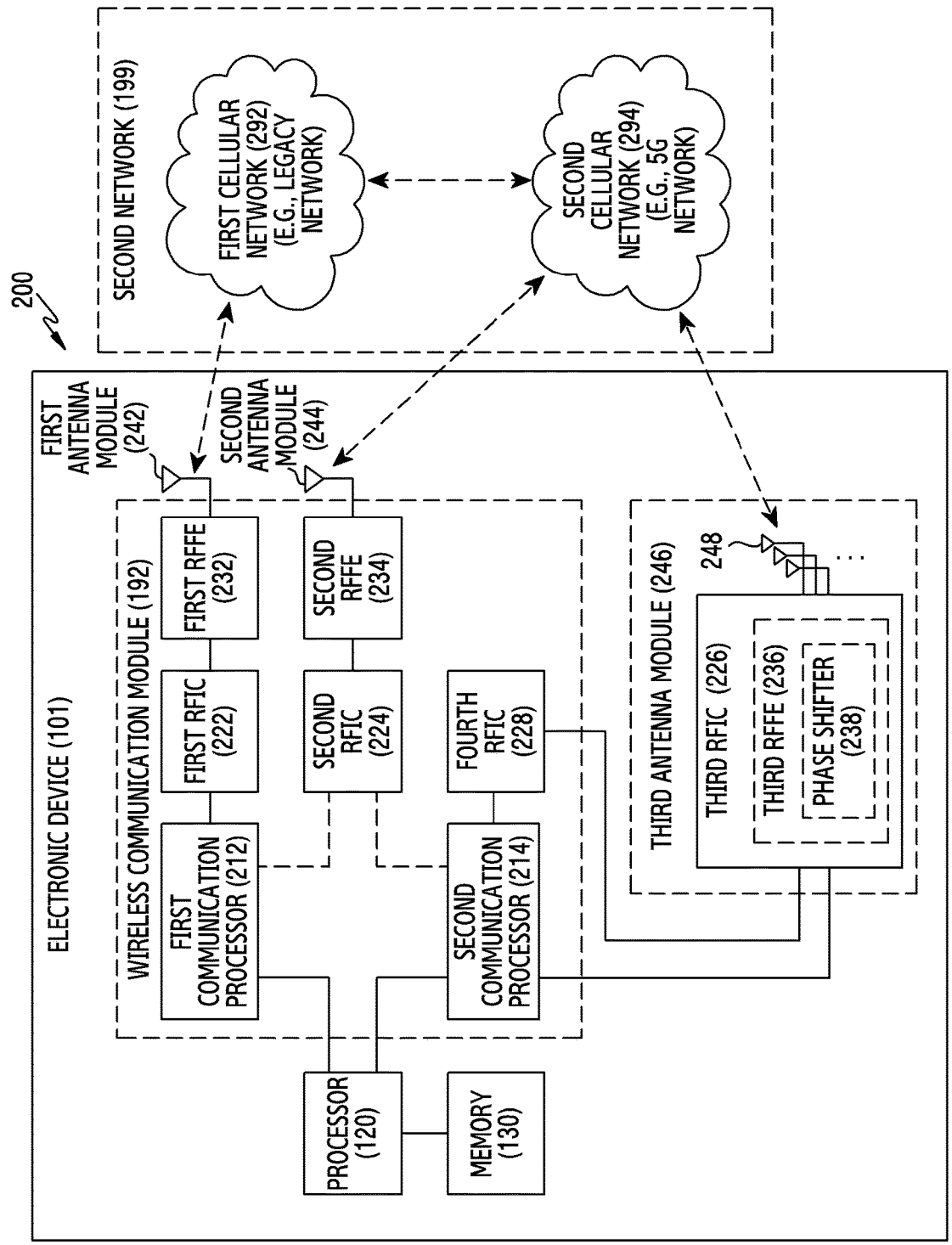
FIG. 2 is a block diagram of an electronic device in a network environment including a plurality of cellular networks, according to certain embodiments.

FIG. 2 is a block diagram 200 of an electronic device 101 in a network environment including a plurality of cellular networks, according to certain embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one component from among components described in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may establish a communication channel of a band to be used for wireless communication with the first cellular network 292, and may support legacy network communication using the established communication channel. According to certain embodiments, the first cellular network may be a legacy network including a second-generation (2G), 3G, 4G, or long term evolution (LTE) network. The second communication processor 214 may establish a communication channel corresponding to a designated band (for example: approximately 6 GHz to approximately 60 GHz) among bands to be used for wireless communication with the second cellular network 294, and may support 5G network communication using the established communication channel. According to certain embodiments, the second cellular network 294 may be a 5G network defined by 3GPP. In addition, according to an embodiment, the first communication processor 212 or the second communication processor 214 may establish a communication channel corresponding to another designated band (for example: approximately 6 GHz or less) among bands to be used for wireless communication with the second cellular network 294, and may support 5G network communication using the established communication channel. According to an embodiment, the first communication processor 212 and the second communication processor 214 may be configured in a single chip or a single package. According to certain embodiments, the first communication processor 212 or the second communication processor 214 may be disposed with the processor 120, an auxiliary processor (for example: an auxiliary processor 123 of FIG. 1), or a communication module (for example: a communication module 190 of FIG. 1) in a single chip or a single package. According to an embodiment, the first communication processor 212 and the second communication processor 214 may be directly or indirectly connected to each other by an interface (not shown) and unidirectionally or bidirectionally provide or receive data or a control signal.

The first RFIC 222 may convert, at the time of transmission, a baseband signal, which is produced by the first communication processor 212, into a radio frequency (RF) signal of approximately 700 MHz to approximately 3 GHz used for the first cellular network 292 (for example: the legacy network). At the time of reception, an RF signal may be acquired from the first cellular network 292 (for example: the legacy network) through an antenna (for example: the first antenna module 242) and preprocessed through an RFFE (for example: the first RFFE 232). The first RFIC 222 may convert a preprocessed RF signal into a baseband signal so as to allow the baseband signal to be processed by the first communication processor 212.

The second RFIC 224 may convert, at the time of transmission, a baseband signal, which is produced by the first communication processor 212 or the second communication processor 214, into an RF signal (hereinafter, a 5G Sub6 RF signal) of a Sub6 band (for example: approximately 6 GHz or less) used for the second cellular network 294 (for example: the 5G network). At the time of reception, a 5G Sub6 RF signal may be acquired from the second cellular network 294 (for example: the 5G network) through an antenna (for example: the second antenna module 244) and preprocessed through an RFFE (for example: the second RFFE 234). The second RFIC 224 may convert a preprocessed 5G Sub6 RF signal into a baseband signal so as to allow the baseband signal to be processed by a corresponding communication processor from among the first communication processor 212 or the second communication processor 214.

The third RFIC 226 may convert a baseband signal, which is produced by the second communication processor 214, into an RF signal (hereinafter, a 5G Above6 RF signal) of a 5G Above6 band (for example: approximately 6 GHz to approximately 60 GHz) to be used for the second cellular network 294 (for example: the 5G network). At the time of reception, a 5G Above6 RF signal may be acquired from the second cellular network 294 (for example: the 5G network) through an antenna (for example: the antenna 248) and preprocessed through the third RFFE 236. The third RFIC 226 may convert a preprocessed 5G Above6 RF signal into a baseband signal so as to allow the baseband signal to be processed by the second communication processor 214. According to an embodiment, the third RFFE 236 may be disposed as a part of the third RFIC 226.

According to an embodiment, the electronic device 101 may include the fourth RFIC 228 independently from or as at least a part of the third RFIC 226. In this case, the fourth RFIC 228 may convert a baseband signal, which is produced by the second communication processor 214, into an RF signal (hereinafter, an IF signal) of an intermediate frequency band (for example: approximately 9 GHz to approximately 11 GHz), and then transmit the IF signal to the third RFIC 226. The third RFIC 226 may convert an IF signal into a 5G Above6 RF signal. At the time of reception, a 5G Above6 RF signal may be received from the second cellular network 294 (for example: the 5G network) through an antenna (for example: the antenna 248) and converted into an IF signal by the third RFIC 226. The fourth RFIC 228 may convert an IF signal into a baseband signal so as to allow the baseband signal to be processed by the second communication processor 214.

According to an embodiment, the first RFIC 222 and the second RFIC 224 may be configured as at least a part of a single chip or a single package. According to an embodiment, the first RFFE 232 and the second RFFE 234 may be configured as at least a part of a single chip or a single package. According to an embodiment, at least one antenna module from among the first antenna module 242 or the second antenna module 244 may be omitted or coupled to another antenna module, and process RF signals of a plurality of corresponding bands.

According to an embodiment, the third RFIC 226 and the antenna 248 may be arranged at an identical substrate and may constitute a third antenna module 246. For example, the wireless communication module 192 or the processor 120 may be arranged at a first substrate (for example: a main PCB). In this case, the third RFIC 226 may be arranged at a partial region (for example: a lower surface) of a second substrate (for example: a sub PCB) different from the first substrate, and the antenna 248 may be arranged at another partial region (for example: an upper surface) thereof, and thus the third antenna module 246 may be constituted. By arranging the third RFIC 226 and the antenna 248 at an identical substrate, the length of a transmission line therebetween may be reduced. That is, for example, a loss (for example: attenuation) of a signal of a high frequency band (for example: approximately 6 GHz to 60 GHz) used for 5G network communication, the loss being caused by a transmission line, may be reduced. Accordingly, the electronic device 101 may improve the quality or the speed of communication with the second cellular network 294 (for example: the 5G network).

According to an embodiment, the antenna 248 may be disposed as an antenna array including a plurality of antenna elements usable for beamforming. In this case, the third RFIC 226 may include, for example, as a part of the third RFFE 236, a plurality of phase shifters 238 corresponding to a plurality of antenna elements. At the time of transmission, each of the plurality of phase shifters 238 may shift a phase of a 5G Above6 RF signal to be transmitted to the outside (for example: a base station of a 5G network) of the electronic device 101 through corresponding antenna elements. At the time of reception, each of the plurality of phase shifters 238 may shift a phase of a 5G Above6 RF signal received from the outside into an identical or substantially identical phase. This enables transmission or reception using beamforming between the electronic device 101 and the outside.

The second cellular network 294 (for example: the 5G network) may be operated independently from the first cellular network 292 (for example: the legacy network) (for example: Stand-Alone (SA)), or may be operated in connection therewith (for example: Non-Stand Alone (NSA)). For example, a 5G network may include only an access network (for example: a 5G radio access network (RAN) or a next generation RAN (NG RAN)) but not a core network (for example: a next generation core (NGC)). In this case, the electronic device 101 may access an access network of a 5G network and then access an external network (for example: Internet) under the control of a core network (for example: an evolved packed core (EPC)) of a legacy network. Protocol information (for example: LTE protocol information) for communication with a legacy network or protocol information (for example: new radio (NR) protocol information for communication with a 5G network may be stored in the memory 130 and accessed by another component (for example: the processor 120, the first communication processor 212, or the second communication processor 214).

Figure 3:
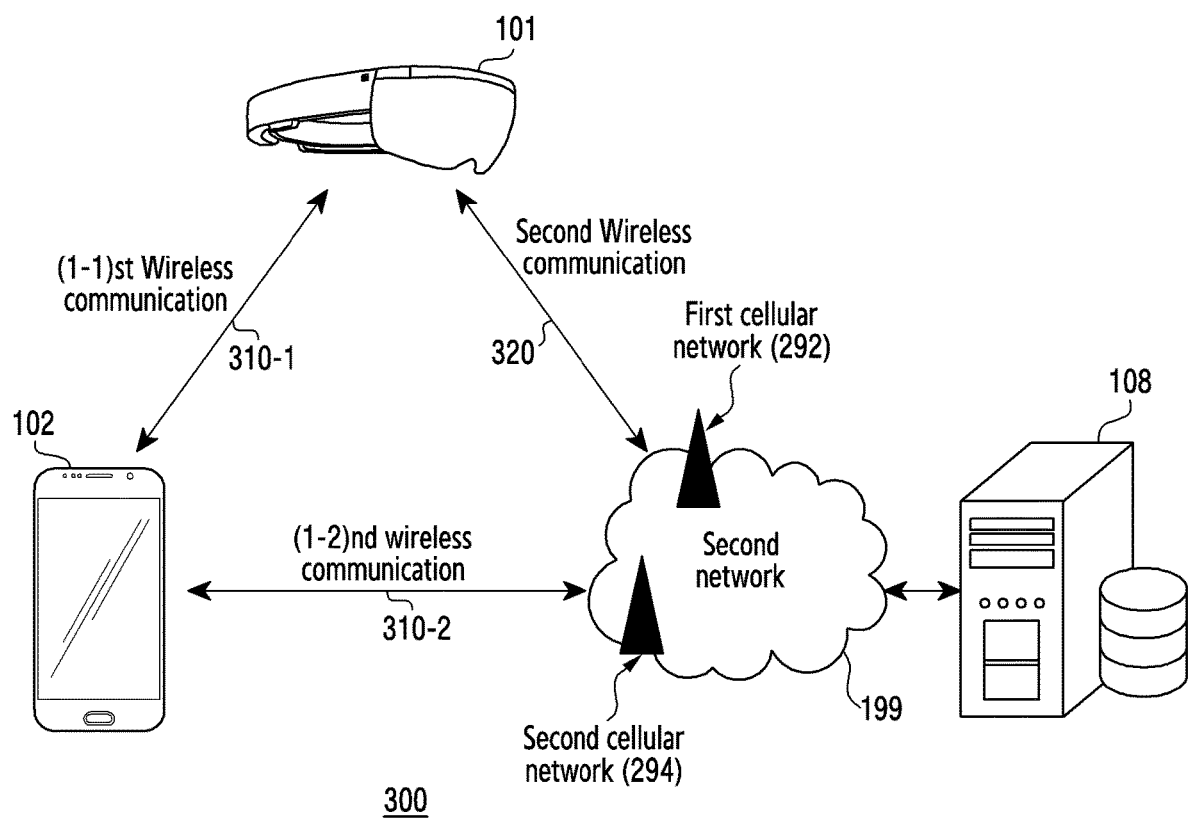
FIG. 3 is a view for describing a system for processing data, according to certain embodiments.

FIG. 3 is a view for describing a system 300 for processing data, according to certain embodiments.

Referring to FIG. 3, in an embodiment, the system 300 may include an electronic device 101, an external electronic device 102, a second network 199, and a server 108.

In an embodiment, the electronic device 101 may be a head-mounted display device (HMD) for providing an augmented reality service or a virtual reality service. However, the electronic device 101 is not limited thereto and may include any electronic device which may provide an augmented reality service or a virtual reality service.

In an embodiment, the electronic device 101 may perform, together with the external electronic device 102, an operation for an augmented reality service. For example, the electronic device 101 and the external electronic device 102 may distributively process an operation for an augmented reality service.

In an embodiment, an operation for an augmented reality service may include: acquiring an image for an external object and information on the position and the orientation of the electronic device 101; detecting, based on the image for the external object, information related to the external object (for example: the characteristic of the external object); transmitting the information related to the external object to the server 108 (or transmitting the information to the server 108 through the second network 199), and receiving, from the server 108, supplemental information related to the external object (for example: the name of the external object, the geographical position of the external object, or the description of the external object); producing, based on the supplemental information received from the server 108, a virtual image; and outputting the produced virtual image. However, an operation for an augmented reality service is not limited to the above-described example.

Hereinafter, an operation of detecting, based on an image for an external object, information related to the external object, an operation of transmitting the information related to the external object to the server 108 and receiving supplemental information related to the external object from the server 108, and an operation of producing, based on the supplemental information received from the server 108, a virtual image will be referred to as an "operation for producing a virtual image (or a virtual reality image)".

In an embodiment, in order to perform, together with the external electronic device 102, an operation for an augmented reality service, the electronic device 101 may perform an operation of acquiring an image for an external object and information on the position and the orientation of the electronic device 101 and an operation of outputting a produced virtual image, and may allow the external electronic device 102 to perform an operation of detecting, based on the image for the external object, information related to the external object and an operation for producing the virtual image. In an embodiment, the electronic device 101 may perform, independently from the external electronic device 102, an operation for an augmented reality service. For example, the electronic device 101 may perform, without distributed processing with the external electronic device, an operation of acquiring an image for an external object and information on the position and the orientation of the electronic device, an operation of detecting information related to the external object, an operation for producing a virtual image, and an operation of outputting the virtual image.

In an embodiment, the electronic device 101 may perform, together with the external electronic device 102, an operation for a virtual reality service. For example, the electronic device 101 and the external electronic device 102 may distributively process an operation for an augmented reality service.

In an embodiment, an operation for a virtual reality service may include an operation of acquiring information on the position and the orientation of the electronic device 101, an operation of requesting, to the server 108 through the second network 199, for content required to produce a virtual reality image, and receiving, from the server 108, the content required to produce a virtual reality image, an operation of producing a virtual reality image, and an operation of outputting the virtual reality image. However, an operation for a virtual reality service is not limited to the above-described example.

Hereinafter, an operation of requesting, to the server 108, content required to produce a virtual reality image, and receiving, from the server 108, the content required to produce a virtual reality image, and an operation of producing a virtual reality image will be referred to as an "operation for producing a virtual reality image".

In an embodiment, in order to perform, together with the external electronic device 102, an operation for a virtual reality service, the electronic device 101 may perform an operation of acquiring information on the position and the orientation of the electronic device 101 and an operation of outputting a virtual reality image, and may allow the external electronic device 102 to perform an operation for producing a virtual reality image. In an embodiment, the electronic device 101 may perform, independently from the external electronic device 102, an operation for a virtual reality service. For example, the electronic device 101 may perform, without distributed processing with the external electronic device 102, an operation of acquiring information on the position and the orientation of the electronic device 101, an operation for producing a virtual reality image, and an operation of outputting the virtual reality image.

In an embodiment, the external electronic device 102 may be an electronic device which may perform an operation for producing an augmented reality image (or a virtual image) or an operation for producing a virtual reality image.

In an embodiment, the external electronic device 102 may perform, in response to a request received from the electronic device 101, an operation for producing an augmented reality image or an operation for producing a virtual reality image. The external electronic device 102 may perform an operation for producing an augmented reality image or an operation for producing a virtual reality image, and then transmit the produced augmented reality or virtual reality image to the electronic device 101.

In an embodiment, in response to a request of the electronic device 101 or the external electronic device 102, the server 108 may transmit, to the electronic device 101 or the external electronic device 102, through the second network 199, information required to produce an augmented reality image or a virtual reality image. For example, the server 108 may provide additional information corresponding to an external object as information required to produce an augmented reality image. As another example, in real time (or in a streaming manner), the server 108 may provide, through the second network 199, content (for example: an omnidirectional image) required to produce a virtual reality image.

Based on various information or conditions, the electronic device 101 may determine, from among the electronic device 101 and the external electronic device 102, a utilized electronic device for producing an augmented reality image or a virtual reality image.

At least partially based on a communication state, the electronic device 101 may determine, from among the electronic device 101 and the external electronic device 102, a utilized electronic device for producing an augmented reality image or a virtual reality image.

The electronic device 101 may determine whether the server 108 is better accessed using the first wireless communication via the external electronic device 102 (1-1$^{st}$ wireless communication 310-1 and 1-2$^{nd}$ wireless communication 310-2) or directly accessing the server 108 using second wireless communication 320. The electronic device 101 may identify a state of (1-1)th wireless communication 310-1 (for example: 5G cellular network communication or short-range wireless communication (for example: Wi-Fi or wireless gigabit alliance)) between the electronic device 101 and the external electronic device 102 (or a state of the (1-1)th wireless communication 310-1 and/or (1-2)th wireless communication 310-2 (for example: 5G cellular network communication)), and a state of second wireless communication 320 (for example: 5G cellular network communication) between the electronic device 101 and the server 108.

In an embodiment, when it is identified that the state of the (1-1)th wireless communication 310-1 is better than the state of the second wireless communication 320, the electronic device 101 may make a determination to perform, through the external electronic device 102, an operation for producing an augmented reality image or an operation for producing a virtual reality image. In an embodiment, when it is identified that the state of the second wireless communication 320 is better than the state of the (1-1)th wireless communication 310-1, the electronic device 101 may make a determination to perform, by the electronic device 101, an operation for producing an augmented reality image or an operation for producing a virtual reality image.

In an embodiment, at least partially based on a communication state (for example: the state of the (1-1)th wireless communication 310-1 and the state of the second wireless communication 320), a state of a battery of the electronic device 101, a consumed time, consumed electrical current amount, or increased temperature required to perform an operation for producing an augmented reality image or an operation for producing a virtual reality image in each of the electronic device 101 and the external electronic device 102, or a combination thereof, the electronic device 101 may determine, from among the electronic device 101 and the external electronic device 102, a utilized electronic device for performing an operation for producing an augmented reality image or an operation for producing a virtual reality image.

In an embodiment, the electronic device 101 may perform, through the external electronic device 102 according to various pieces of information, an operation for producing an augmented reality image or an operation for producing a virtual reality image (or may distributively process data together with the external electronic device 102), so as to reduce power consumed in the electronic device 101 and reduce a heating amount. Accordingly, the electronic device 101 may reduce the weight of a battery of the electronic device 101, and may minimize power produced from the electronic device 101, so as to reduce an influence on a human body.

Hereinafter, certain embodiments of a method for processing data will be described.

Figure 4:
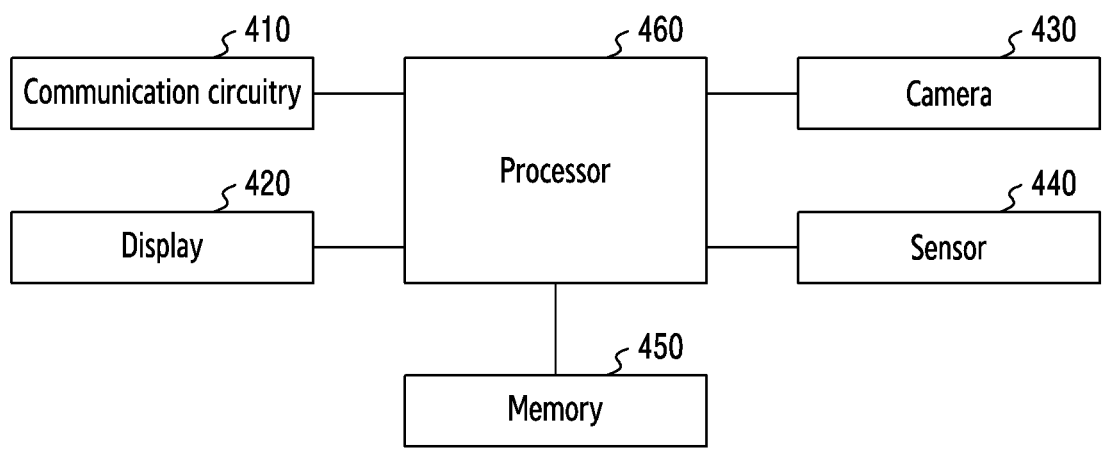
FIG. 4 is a block diagram of an electronic device for processing data, according to certain embodiments.

FIG. 4 is a block diagram of an electronic device 101 for processing data, according to certain embodiments.

Referring to FIG. 4, in an embodiment, the electronic device 101 may include a communication circuitry 410, a display 420, a camera 430, a sensor 440, a memory 450, and a processor 460.

In an embodiment, the communication circuitry 410 may be at least partially identical or similar to a wireless communication circuitry 192 of FIG. 1. For example, the communication circuitry 410 may support cellular communication (for example: 5G network communication). As another example, the communication circuitry 410 may support short-range wireless communication (for example: wireless gigabit alliance communication). However, wireless communication supported by the communication circuitry 410 is not limited to the above-described examples.

In an embodiment, the communication circuitry 410 may connect the electronic device 101 to an external electronic device 102 or a server 108. For example, the communication circuitry 410 may connect the electronic device 101 and the external electronic device 102 in a peer-to-peer (P2P) (or device-to-device (D2P)) type by using 5G network communication. However, connection of the electronic device 101 is not limited thereto, and the communication circuitry 410 may connect the electronic device 101 and the external electronic device 102 in a P2P type by using short-range wireless communication (for example: Wi-Fi or wireless gigabit alliance communication). As another example, the communication circuitry 410 may connect the electronic device 101 and the server 108 by using 5G cellular network communication (for example: second cellular network 294 communication).

In an embodiment, the display 420 may be at least partially identical or similar to a display device 160 of FIG. 1.

In an embodiment, when the electronic device 101 is a see-through-type HMD device (or is configured as a see-through-type HMD device), the display 420 may include a transparent (or translucent) member (or transparent glass) and a light-emitting device (or a light output device) which may project a virtual image onto the transparent member, so as to allow a user wearing the electronic device 101 to see a real world. In an embodiment, the transparent material may be configured to allow external light facing a first surface (for example: a surface facing the opposite direction of a direction facing the head of a user) of the transparent material to penetrate the first surface and the opposite surface (for example: a surface facing the head of the user). In an embodiment, the light-emitting device which may project a virtual image may be disposed at a side surface of the transparent member or an side surface of a frame for supporting the transparent member, and may output light for allowing a virtual image to be shown on the transparent member.

In an embodiment, when the electronic device 101 is a see-closed-type HMD device, the display 420 may display, on a surface facing the head of a user (for example: the eye of the user), a virtual image or an image corresponding to the orientation of the electronic device 101.

However, the type of the display 420 is not limited to the above-described example.

In an embodiment, the camera 430 may be at least partially identical or similar to a camera module 180 of FIG. 1.

In an embodiment, the camera 430 may acquire an image for an environment (or a real world) including an external object. In an embodiment, the camera 430 may be configured to cover a region in which a field of view of the camera 430 is wider than a region of the display 420, or a region which corresponds to the region of the display 420. In an embodiment, the camera 430 may be configured to cover a region in which a field of view of the camera 430 is wider than a field of view of a user, or a region corresponding to the field of view of the user. In an embodiment, the camera 430 for acquiring an image for an environment including an external object may be arranged to face the same direction as a direction which a field of view of a user wearing the electronic device 101 faces.

In an embodiment, the camera 430 may include a camera for tracking the gaze of a user wearing the electronic device 101 (or the eye of the user). In an embodiment, the camera for tracking the gaze of the user may be arranged to face the eye of the user.

In an embodiment, the sensor 440 may be at least partially identical or similar to a sensor module 176 of FIG. 1.

In an embodiment, the sensor 440 may include a sensor (for example: a GPS module) for acquiring information on the position of the electronic device 101. In an embodiment, the sensor 440 may transmit information on the positon of the electronic device 101 to the processor 460.

In an embodiment, the sensor 440 may include a motion sensor (or an inertial sensor) for acquiring information on the orientation of the electronic device 101. For example, the sensor 440 may include at least one of a gyro sensor, an acceleration sensor, or a geomagnetic sensor. In an embodiment, the orientation of the electronic device 101 may include information on a direction which the electronic device 101 faces and a degree in which the electronic device 101 is inclined. In an embodiment, the sensor 440 may acquire information on the orientation of the electronic device 101 at designated time intervals (or periodically) or in real time, and transmit information on the orientation of the electronic device 101 to the processor 460. In certain embodiments, the sensor 440 can include a thermometer to measure the temperature of the electronic device 101. In certain embodiments, the sensor 440 can determine a battery level.

In an embodiment, the memory 450 may be at least partially identical or similar to a memory 130 of FIG. 1.

In an embodiment, the memory 450 may store, in each of the electronic device 101 and an external electronic device 102, information on at least one of a required time, consumed electrical current amount, or increased temperature required to perform an operation for producing an augmented reality image or an operation for producing a virtual reality image.

In an embodiment, based on a state of the electronic device 101, the memory 450 may store information used to change (for example: increase or decrease) a weighted value configured for a communication state (for example: a state of a (1-1)th wireless communication 310-1 and a state of a second wireless communication 320), a state of a battery of the electronic device 101, a consumed time, consumed electrical current amount, or increased temperature required to perform an operation for producing an augmented reality image or an operation for producing a virtual reality image in each of the electronic device 101 and an external electronic device 102, or a combination thereof.

In an embodiment, the processor 460 may be at least partially identical or similar to a processor 120 of FIG. 1.

In an embodiment, the processor 460 may control an overall operation of the electronic device 101 to perform a method for processing data.

Hereinafter, certain embodiments of an operation of processing, by the processor 460, data to provide an augmented reality service or a virtual reality service will be described.

An electronic device according to certain embodiments may include a communication circuitry; a camera; a display; a sensor; and at least one processor operably connected to the communication circuitry, the camera, the display, and the sensor, wherein the at least one processor is configured to: acquire an image through the camera; acquire, through the sensor, information on a position and a orientation of the electronic device; select, from among the electronic device and an external electronic device, a selected electronic device to produce a virtual image related to the image; when the selected electronic device is the external electronic device transmit, through the communication circuitry, the information on the position and the orientation of the electronic device and the image to the external electronic device; receive, through the communication circuitry, the virtual image; and display the virtual image through the display.

In certain embodiments, the at least one processor is configured to: determine a first communication state between the electronic device and the external electronic device and a second communication state between the electronic device and a server; and wherein select from among the electronic device and the external electronic device is at least partially based on the first communication state and the second communication state.

In certain embodiments, the at least one processor is configured to: determine a first communication state between the electronic device and the external electronic device and a second communication state between the electronic device and a server; and determine a state of a battery of the electronic device; and wherein select from among the electronic device and the external electronic device is at least partially based on the first communication state, the second communication state, and the state of the battery of the electronic device.

In certain embodiments, the at least one processor is configured to: determine a temperature of the electronic device; and wherein select from among the electronic device and the external electronic device is at least partially based on the first communication state, the second communication state, the state of the battery of the electronic device, and the temperature of the electronic device.

In certain embodiments, the at least one processor is configured to: determine, in each of the electronic device and the external electronic device, at least one of a consumed time, consumed power, or a heating amount required when the virtual image is produced; and wherein select from among the electronic and the external electronic device is based on at least one of the consumed time, the consumed power, or the heating amount.

In certain embodiments, the at least one processor is configured to: configure a weighted value for the at least one of the consumed time, the consumed power, or the heating amount; and wherein select from among the electronic and the external electronic device is based on the weighted value.

In certain embodiments, the at least one processor is configured to: determine at least one of the temperature of the electronic device or whether or not the electronic device performs a charging operation; and adjust, based on at least one of the temperature of the electronic device or whether or not the electronic device performs a charging operation, the weighted value.

In certain embodiments, the at least one processor is configured to: receive, from at least one external electronic device, information on a capability to produce the virtual image; and identify, based on the received information on the capability, that the external electronic device has a capability to perform an operation for producing the virtual image.

According to certain embodiments, an electronic device comprises: a communication circuitry; a camera; a display; a sensor; and at least one processor operably connected to the communication circuitry, the camera, the display, and the sensor, wherein the at least one processor is configured to: acquire an image through the camera; acquire, through the sensor, information on the position and the orientation of the electronic device; determine whether or not to produce a virtual image related to the image with an external electronic device connectable to the electronic device; when it is determined to produce the virtual image with the external electronic device transmit, through the communication circuitry, the information on the position and the orientation of the electronic device and the image to the external electronic device; receive, through the communication circuitry, the virtual image from the external electronic device; and display the virtual image through the display.

In certain embodiments, the at least one processor is configured to: identify a first communication state between the electronic device and the external electronic device and a second communication state between the electronic device and a server for providing information required to produce the virtual image; and determine whether or not to produce the virtual image by using the external electronic device at least partially based on the first communication state and the second communication state.

In certain embodiments, the at least one processor is configured to: identify a first communication state between the electronic device and the external electronic device and a second communication state between the electronic device and a server for providing information required to produce the virtual image; identify a state of a battery of the electronic device; and determine whether or not to produce the virtual image by using the external electronic device at least partially based on the first communication state, the second communication state, and the state of the battery of the electronic device.

In certain embodiments, the at least one processor is configured to: determine at least one of a consumed time, consumed power, or a heating amount; and based on at least one of the consumed time, the consumed power, or the heating amount and at least one of a designated time, designated power, or a designated heating amount, determine whether or not to produce the virtual image by using the external electronic device.

Figure 5:
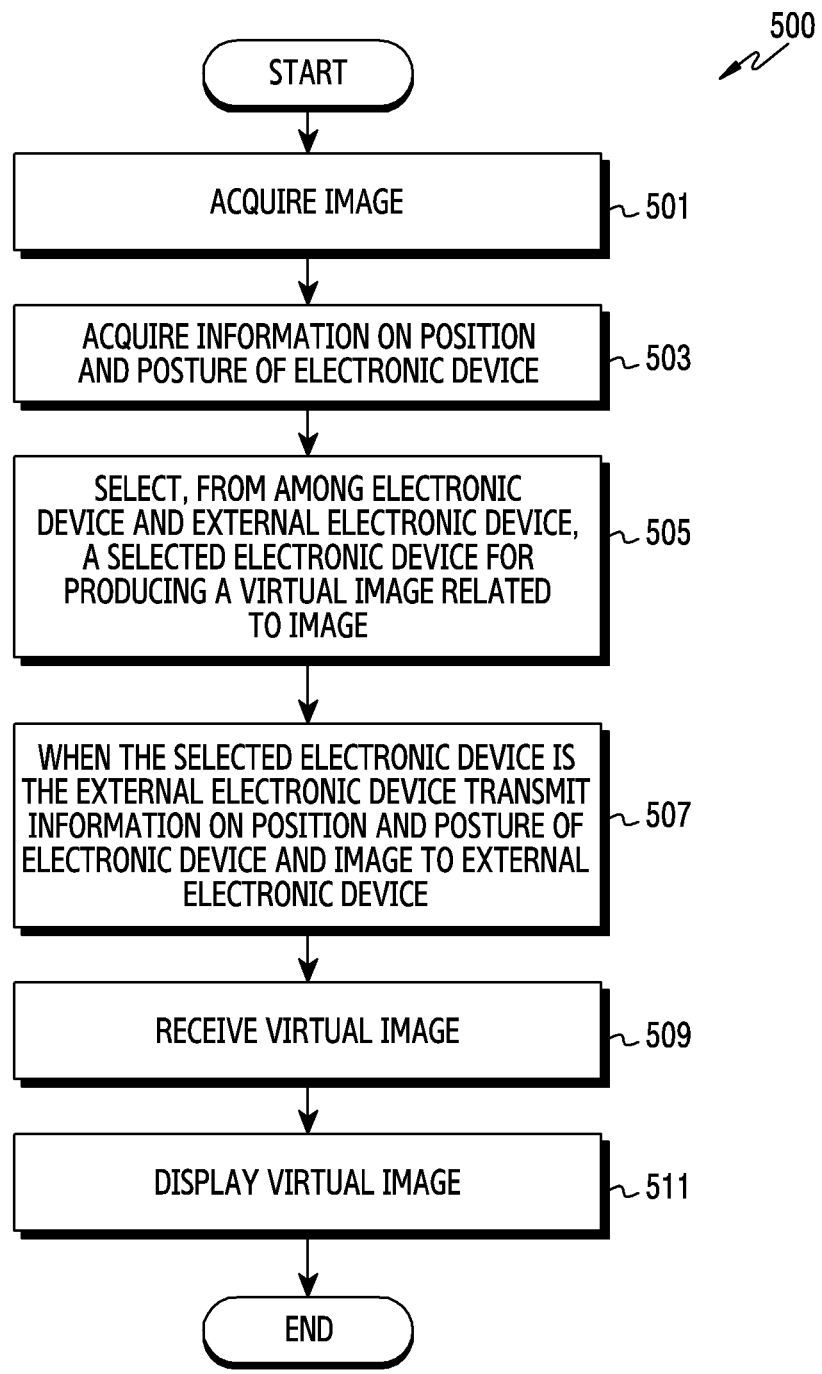
FIG. 5 is a flowchart for describing a method for processing data to provide an augmented reality service in an electronic device, according to certain embodiments.

FIG. 5 is a flowchart 500 for describing a method for processing data to provide an augmented reality service in an electronic device 101, according to certain embodiments.

In FIG. 5, a description will be made under the assumption that the electronic device 101 is an HMD device which may provide an augmented reality service in a see-through manner, and that the electronic device 101 and an external electronic device 102 are electronic devices which may perform an operation for producing an augmented reality image (or have a capability to produce an augmented reality image).

Referring to FIG. 5, in operation 501, in an embodiment, a processor 460 may acquire an image.

In an embodiment, a processor 460 may acquire, through a camera 430, an image for an external object present in a real world (or an image including an image part for the external object). In an embodiment, a processor 460 may acquire an image for an object through a camera 430 in real time.

Although not illustrated in FIG. 5, in an embodiment, a processor 460 may acquire, through a camera 430, an image for the eye of a user wearing the electronic device 101, so as to acquire information on the gaze of the user wearing the electronic device 101.

In operation 503, in an embodiment, a processor 460 may acquire, through a sensor 440, information on the position and the orientation of the electronic device 101.

In an embodiment, a processor 460 may acquire, from a GPS module, information on the position of the electronic device 101.

In an embodiment, a processor 460 may acquire, from a motion sensor (or an inertial sensor), information on the orientation of the electronic device 101. In an embodiment, information on the orientation of the electronic device 101 may include information on a direction which the electronic device 101 faces and a degree in which the electronic device 101 is inclined. However, information on the orientation of the electronic device 101 is not limited to the above-described example. In an embodiment, a processor 460 may acquire, from a motion sensor, information on the orientation of the electronic device 101 in real time.

In an embodiment, FIG. 5 illustrates that embodiments of operation 501 are performed prior to embodiments of operation 503, but is not limited thereto. For example, embodiments of operation 503 may be performed prior to embodiments of operation 501, and embodiments of operation 501 and embodiments of operation 503 may be performed concurrently (or in parallel).

In operation 505, in an embodiment, a processor 460 may determine, from among the electronic device 101 and an external electronic device 102, a utilized electronic device for producing a virtual image related to an image. For example, a processor 460 may determine (or select), from among the electronic device 101 and an external electronic device 102, a utilized electronic device for performing an operation for producing an augmented reality image.

In an embodiment, based on a communication state (for example: a state of (1-1)th wireless communication 310-1) between the electronic device 101 and an external electronic device 102 and a communication state (for example: a state of second wireless communication 320) between the electronic device 101 and a server 108, a processor 460 may determine, from among the electronic device 101 and the external electronic device 102, a utilized electronic device for performing an operation for producing an augmented reality image.

For example, a processor 460 may identify that a communication state between the electronic device 101 and an external electronic device 102 is better than a communication state between the electronic device 101 and a server 108. In response to identifying that a communication state between the electronic device 101 and an external electronic device 102 is better than a communication state between the electronic device 101 and a server 108, a processor 460 may determine the external electronic device 102 as a utilized electronic device for performing an operation for producing an augmented reality image. In response to identifying that a communication state between the electronic device 101 and a server 108 is better than a communication state between the electronic device 101 and an external electronic device 102, a processor 460 may determine the electronic device 101 as a utilized electronic device for performing an operation for producing an augmented reality image.

In an embodiment, based on a communication state (for example: a state of (1-1)th wireless communication 310-1) between the electronic device 101 and an external electronic device 102, a communication state (for example: a state of (1-2)th wireless communication 310-2) between the external electronic device 102 and a server 108, and a communication state (for example: a state of second communication 320) between the electronic device 101 and the server 108, a processor 460 may determine, from among the electronic device 101 and the external electronic device 102, a utilized electronic device for performing an operation for producing an augmented reality image. For example, a processor 460 may identify a poor (or inferior) communication state from among a communication state between the electronic device 101 and an external electronic device 102 and a communication state between the external electronic device 102 and a server 108. In response to identifying that the poor communication state is better than a communication state between the electronic device 101 and the server 108, the processor 460 may determine the external electronic device 102 as a utilized electronic device for performing an operation for producing an augmented reality image. In response to identifying that the communication state between the electronic device 101 and the server 108 is better than the poor communication state, the processor 460 may determine the electronic device 101 as a utilized electronic device for performing an operation for producing an augmented reality image.

In an embodiment, a communication state may include the quality of a channel, received signal sensitivity, received signal strength indication, a transmission speed (a data rate), a signal to noise plus interference plus noise ratio (SINR), or a carrier to interference plus noise ratio (CINR). However, a communication state is not limited to the above-described example.

In an embodiment, communication between the electronic device 101 and an external electronic device 102 may be P2P-type 5G network communication. In an embodiment, communication between the electronic device 101 and a server 108 may be 5G cellular network communication. However, communication between the electronic device 101 and an external electronic device 102 or a server 108 is not limited to the above-described example. For example, communication between the electronic device 101 and an external electronic device 102 may include short-range wireless communication (for example: wireless gigabit alliance communication).

In an embodiment, based on a state of a battery of the electronic device 101, a processor 460 may determine, from among the electronic device 101 and an external electronic device 102, a utilized electronic device for performing an operation for producing an augmented reality image. For example, when a remaining amount of a battery of the electronic device 101 is equal to or larger than a designated amount (or critical value), a processor 460 may determine the electronic device 101 as a utilized electronic device for performing an operation for producing an augmented reality image, although it is identified that a communication state between the electronic device 101 and an external electronic device 102 is better than a communication state between the electronic device 101 and a server 108. As another example, when a remaining amount of a battery of the electronic device 101 is smaller than a designated amount, a processor 460 may determine an external electronic device 102 as a utilized electronic device for performing an operation for producing an augmented reality image, although it is identified that a communication state between the electronic device 101 and a server 108 is better than a communication state between the electronic device 101 and the external electronic device 102.

In an embodiment, based on a time consumed when an operation for producing an augmented reality image is performed in each of the electronic device 101 and an external electronic device 102, a processor 460 may determine, from among the electronic device 101 and the external electronic device 102, a utilized electronic device for performing an operation for producing an augmented reality image.

In an embodiment, a processor 460 may determine (or estimate) a time to be consumed when an operation for producing an augmented reality image is performed in the electronic device 101. In an embodiment, a processor 460 may determine (or estimate) a time to be consumed when an operation for producing an augmented reality image is performed in an external electronic device 102. For example, a processor 460 may determine a time obtained by adding up a time of transmitting, to an external electronic device 102, information (for example: information on an external object and information on the position and the orientation of the electronic device 101) required to perform an operation for producing an augmented reality image, a time of producing, by the external electronic device 102, an augmented reality image, and a time of receiving, from the external electronic device 102, an augmented reality image.

In an embodiment, a processor 460 may determine, as a utilized electronic device for performing an operation for producing an augmented reality image, one from among the electronic device 101 and an external electronic device 102, the one consuming a small amount of time while performing an operation for producing an augmented reality image.

In an embodiment, based on power (or an electrical current) consumed in the electronic device 101 when an operation for producing an augmented reality image is performed in each of the electronic device 101 and an external electronic device 102, a processor 460 may determine, from among the electronic device 101 and the external electronic device 102, a utilized electronic device for performing an operation for producing an augmented reality image.

In an embodiment, a processor 460 may determine (or estimate) power to be consumed when an operation for producing an augmented reality image is performed in the electronic device 101. In an embodiment, a processor 460 may determine power obtained by adding up power to be consumed to transmit information (for example: information on an external object and information on the position and the orientation of the electronic device 101) required to perform an operation for producing an augmented reality image in an external electronic device 102 and power to be consumed to receive an augmented reality image from the external electronic device 102. In an embodiment, when power to be consumed when an operation for producing an augmented reality image is performed in the electronic device 101 is larger than the sum of power, a processor 460 may determine an external electronic device 102 as a utilized electronic device for performing an operation for producing an augmented reality image. In an embodiment, when an operation for producing an augmented reality image is performed in the electronic device 101, for example, when the electronic device 101 receives data for producing an augmented reality image from a server 108 through a second network (for example: a first cellular network 292) by using 5G cellular network communication (or a 5G antenna for supporting 5G cellular network communication), a large amount of power may be consumed. Power consumption may be reduced when an external electronic device 102 within a designated distance from (or adjacent to) the electronic device 101 receives, from a server 108 through a second network (for example: a second cellular network 294), data for producing an augmented reality image, and transmits, to the electronic device, the received data for producing an augmented reality image, or an augmented reality image produced, based on the received data for producing an augmented reality image, by the external electronic device 102.

In an embodiment, when power to be consumed when an operation for producing an augmented reality image is performed in the electronic device 101 is equal to or smaller than the sum of power, a processor 460 may determine the electronic device 101 as a utilized electronic device for performing an operation for producing an augmented reality image.

In an embodiment, based on a temperature (or a heating amount) increased in the electronic device 101 when an operation for producing an augmented reality image is performed in each of the electronic device 101 and an external electronic device 102, a processor 460 may determine, from among the electronic device 101 and the external electronic device 102, an operation for producing an augmented reality image.

In an embodiment, a processor 460 may determine (or estimate) the temperature of the electronic device 101, the temperature being expected to increase when an operation for producing an augmented reality image is performed in the electronic device 101. In an embodiment, when the electronic device 101 transmits, to an external electronic device 102, information (for example: information on an external object and information on the position and the orientation of the electronic device 101) required to perform an operation for producing an augmented reality image, and receives an augmented reality image from the external electronic device 102, a processor 460 may determine the temperature of the electronic device 101, the temperature being expected to increase.

In an embodiment, when the temperature of the electronic device 101, the temperature being expected to increase when an operation for producing an augmented reality image is performed in the electronic device 101, is larger than the temperature of the electronic device 101, the temperature being expected to increase when an operation for producing an augmented reality image is performed in an external electronic device 102, a processor 460 may determine the external electronic device 102 as a utilized electronic device for performing an operation for producing an augmented reality image. When the temperature of the electronic device 101, the temperature being expected to increase when an operation for producing an augmented reality image is performed in the electronic device 101, is equal to or smaller than the temperature of the electronic device 101, the temperature being expected to increase when an operation for producing an augmented reality image is performed in an external electronic device 102, a processor 460 may determine the electronic device 101 as a utilized electronic device for performing an operation for producing an augmented reality image.

In an embodiment, at least partially based on a communication state, a state of a battery of the electronic device 101, a consumed time, consumed electrical current amount, or increased temperature required to perform an operation for producing an augmented reality image in each of the electronic device 101 and an external electronic device 102, or a combination thereof, a processor 460 may determine, from among the electronic device 101 and the external electronic device 102, a utilized electronic device for performing an operation for producing an augmented reality image.

In an embodiment, when, from among the electronic device 101 and an external electronic device 102, a utilized electronic device for performing an operation for producing an augmented reality image is determined based on a plurality of pieces of information (or variables or conditions) from among a communication state, a state of a battery of the electronic device 101, and a consumed time, consumed electrical current amount, or increased temperature required to perform an operation for producing an augmented reality image in each of the electronic device 101 and the external electronic device 102, a processor 460 may configure (or impart) a weighted value for (or to) each of the plurality of pieces of information. An operation of configuring a weighted value for each of a plurality of information will be described in detail later with reference to FIG. 7.

In an embodiment, FIG. 5 illustrates that operation 501 and operation 503 are performed prior to operation 505, but is not limited thereto. For example, at least one of embodiments of operation 501 or embodiments of operation 503 may be performed after embodiments of operation 505 are performed, or may be performed concurrently therewith.

In an embodiment, although not illustrated in FIG. 5, before embodiments of operation 505 are performed, a processor 460 may perform an operation of selecting (or identifying or detecting), from among a plurality of external electronic devices communicable with the electronic device 101, at least one selected external electronic device which may produce an augmented reality image. In an embodiment, when a processor 460 selects one or more external electronic devices which may produce an augmented reality image, the processor 460 may perform embodiments of operations of operation 505 for each of the one or more external electronic devices. For example, when a processor 460 selects, from among a plurality of external electronic devices communicable with the electronic device 101, a first external electronic device and a second external electronic device which may perform an operation for producing an augmented reality image, the processor 460 may determine, from among the electronic device 101, the first external electronic device, and the second external electronic device, a utilized electronic device for producing a virtual image related to an image. An operation of determining, by a processor 460, from among a plurality of external electronic devices communicable with the electronic device 101, at least one external electronic device which may perform an operation for producing an augmented reality image will be described in detail later with reference to FIG. 6 below.

In an embodiment, although not illustrated in FIG. 5, before performing embodiments of operation 507 after performing embodiments of operation 505, a processor 460 may connect, through a communication circuitry 410, the electronic device 101 and an external electronic device 102 to each other. However, a connection sequence is not limited thereto, and a processor 460 may perform embodiments of operation 505 after the electronic device 101 and an external electronic device 102 are connected to each other.

In operation 507, in an embodiment, when an external electronic device 102 is selected, a processor 460 may transmit, through a communication circuitry 410, information on the position and the orientation of the electronic device 101, and an image to the external electronic device 102.

For example, a processor 460 may connect, through a communication circuitry 410, the electronic device 101 and an external electronic device 102 to each other by using a P2P-type 5G network communication scheme. As another example, a processor 460 may connect, through a communication circuitry 410, the electronic device 101 and an external electronic device 102 by using a short-range communication module. However, a method for connecting, by a processor 460, the electronic device 101 and an external electronic device 102 to each other is not limited to the above-described examples. A processor 460 may transmit, to an external electronic device 102 through a communication circuitry 410, an image (for example: an image for an external object (or an image for an external object and an image for the eye of a user wearing the electronic device 101) acquired by performing operation 501 and information on the position and the orientation of the electronic device 101, the information being acquired by performing operation 503.

In operation 509, in an embodiment the communication circuitry 410 receives the virtual image. When the selected electronic device is the external electronic device, a processor 460 may receive, through a communication circuitry 410, a virtual image (or an augmented reality image) from an external electronic device 102. When the selected electronic device is the electronic device 101, the processor 460 may receive the virtual image directly from server 108.

Although not illustrated in FIG. 5, in an embodiment, in response to receiving information on the position and the orientation of the electronic device 101 and an image from the electronic device 101, an external electronic device 102 may perform an operation for producing an augmented reality image. In an embodiment, an external electronic device 102 may detect, from an image, information related to an external object (for example: the characteristic of the external object). An external electronic device 102 may transmit, to a server 108, detected information related to an external object and information on the position and the orientation of the electronic device 101, and receive, from the server 108, supplemental information related to the external object (for example: the name of the external object, the geographical position of the external object, or the description of the external object). Based on supplemental information received from a server 108, the supplemental information being related to an external object, an external electronic device 102 may produce a virtual image. An external electronic device 102 may determine a positon, on which a virtual image is to be displayed, on a display 420 of the electronic device 101, such that the virtual image is displayed while corresponding (or being mapped) to an external object shown (or displayed) through the display 420. However, an operation for producing an augmented reality image, the operation being performed in response to receiving, by an external electronic device 102, information on the position and the orientation of the electronic device 101 and an image from the electronic device 101, is not limited to the above-described example.

In operation 511, in an embodiment, a processor 460 may display, through a display 420, a virtual image received through a communication circuitry 410.

In an embodiment, a processor 460 may display, through a display 420, a virtual image, such that the virtual image corresponds to an external object. For example, a processor 460 may identify a position on which a virtual image is to be displayed. A processor 460 may display, through a display 420, a virtual image, such that the position of the virtual image is mapped to the position of an external object shown on a transparent member. A processor 460 may project, onto a transparent member, light for displaying a virtual image, such that the virtual image is display adjacently to an external object shown on the transparent member.

In an embodiment, at least partially based on the position and the orientation of the electronic device 101, a processor 460 may display, through a display 420, a virtual image, the position and the orientation being changed while the electronic device 101 transmits, to an external electronic device 102, information on the position and the orientation of the electronic device 101 and an image, and then receives the virtual image from the external electronic device 102 (hereinafter, referred to as "during a time in which an operation for producing an augmented reality image is performed"). In an embodiment, during a time in which an operation for producing an augmented reality image is performed, the position and the orientation of the electronic device 101 may be changed. In an embodiment, a processor 460 may identify the position and the orientation of the electronic device 101, the position and the orientation being changed during a time in which an operation for producing an augmented reality image is performed, and may display, through a display 420, a virtual image, such that the virtual image corresponds to the changed position and orientation of the electronic device 101. In an embodiment, a processor 460 may adjust, in consideration of a changed amount of the position and the orientation of the electronic device 101, a position on which a virtual image is to be displayed. In an embodiment, a processor 460 may adjust a position on which a virtual image is to be displayed, such that the virtual image corresponds to the position of an external object, the position being changed according to a change in the position and the orientation of the electronic device 101. A processor 460 may display, through a display 420, a virtual image on an adjusted positon.

Although not illustrated in FIG. 5, in an embodiment, when a processor 460 determines the electronic device 101 as a utilized electronic device for producing a virtual image in embodiments of operation 505, the processor 460 may perform an operation for producing a virtual image (or an augmented reality image). For example, a processor 460 may detect, from an image, information related to an external object (for example: the characteristic of the external object). A processor 460 may transmit, to a server 108 through a communication circuitry 410, detected information related to an external object and information on the position and the orientation of the electronic device 101, and receive, from the server 108, supplemental information related to the external object (for example: the name of the external object, the geographical position of the external object, or the description of the external object). Based on supplemental information received from a server 108, the supplemental information being related to an external object, a processor 460 may produce a virtual image. A processor 460 may determine a positon, on which a virtual image is to be displayed, on a display 420 of the electronic device 101, such that the virtual image is displayed while corresponding (or being mapped) to an external object shown (or displayed) through the display 420. However, an operation for producing an augmented reality image, the operation being performed by a processor 460, is not limited to the above-described example. A processor 460 may perform an operation of, after a virtual image is produced, displaying the virtual image through a display 420 as pre-described in embodiments of operation 511.

FIG. 5 exemplifies a method for providing, by the electronic device 101, an augmented reality service in a see-through manner, but is not limited thereto. Identically or similarly thereto, a method for providing, by the electronic device 101, an augmented reality service in a see-closed manner may be applied.

Figure 6:
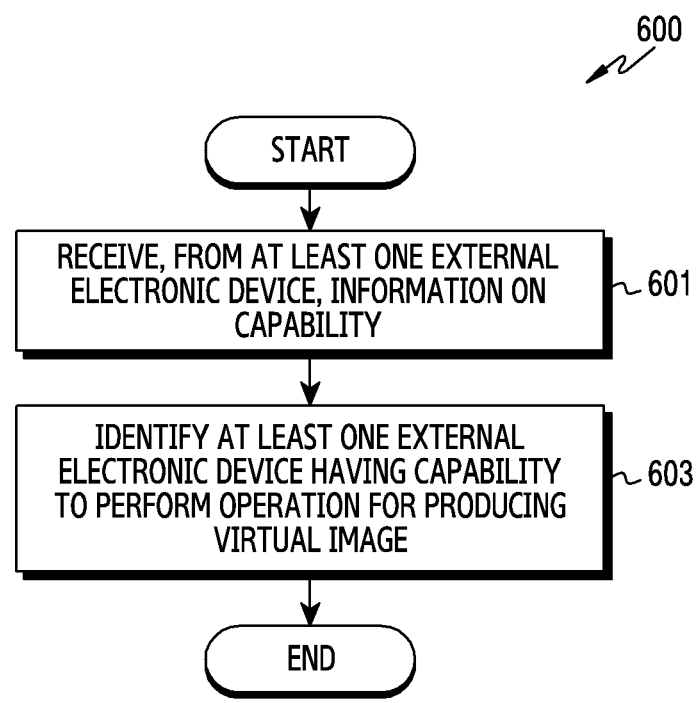
FIG. 6 is a flowchart for describing a method for identifying an external electronic device for producing a virtual image in an electronic device, according to certain embodiments.

FIG. 6 is a flowchart 600 for describing a method for identifying an external electronic device 102 for producing a virtual image in an electronic device 101, according to certain embodiments.

In an embodiment, embodiments of operations performed in FIG. 6 may be operations performed before embodiments of operation 505 of FIG. 5 are performed, or included in embodiments of operation 505.

Referring to FIG. 6, in operation 601, in an embodiment, a processor 460 may receive, through a communication circuitry 410, information on a capability from one or more external electronic devices 102.

In an embodiment, a processor 460 may receive, from one or more external electronic devices through a communication circuitry 410, information related to a capability to perform an operation for producing an augmented reality image.

In an embodiment, before establishing communication connection between the electronic device 101 and one or more external electronic devices, a processor 460 may receive, through a communication circuitry 410, information related to a capability to perform an operation for producing an augmented reality image from one or more external electronic devices. In an embodiment, before establishing communication connection between the electronic device 101 and one or more external electronic devices, a processor 460 may receive, through a communication circuitry 410, information related to a capability to perform an operation for producing an augmented reality image, the information being transmitted from one or more external electronic devices in response to a request from the electronic device 101. In an embodiment, after establishing communication connection between the electronic device 101 and one or more external electronic devices, a processor 460 may receive, through a communication circuitry 410, information related to a capability to perform an operation for producing an augmented reality image, the information being transmitted from one or more external electronic devices in response to a request from the electronic device 101.

In an embodiment, a processor 460 may receive information on a capability from one or more external electronic devices by using various communication schemes. For example, a processor 460 may receive information on a capability from one or more external electronic devices by using short-range wireless communication. As another example, information on a capability may be received from one or more external electronic devices by using 5G cellular network communication. However, a communication scheme for receiving, by a processor 460, information on a capability from one or more external electronic devices is not limited to the above-descried examples.

In operation 603, in an embodiment, a processor 460 may identify, from among one or more external electronic devices, at least one external electronic device having a capability to perform an operation for producing a virtual image.

In an embodiment, a processor 460 may identify information related to a capability to perform an operation for producing an augmented reality image, the information being received from one or more external electronic devices. At least partially based on received information related to a capability to perform an operation for producing a virtual image, a processor 460 may identify at least one external electronic device having the capability.

Although not illustrated in FIG. 6, in an embodiment, after operation 603 is performed, a processor 460 may perform operation 505 of FIG. 5 for each of one or more identified external electronic devices. When a processor 460 determines, from among one or more external electronic devices, one external electronic device as a utilized electronic device for producing a virtual image, the processor 460 may establish, through a communication circuitry 410, communication connection between the electronic device 101 and the determined external electronic device.

Although not illustrated in FIG. 6, in an embodiment, when it is identified that all of one or more external electronic devices have no capability to perform an operation for producing an augmented reality image, a processor 460 may determine the electronic device 101 as a utilized electronic device for performing an operation for producing an augmented reality image.

In an embodiment, when it is identified that all of one or more electronic devices have no capability to produce an augmented reality image and a battery level of the electronic device 101 is equal to or larger than a designated level, a processor 460 may determine the electronic device 101 as a utilized electronic device for performing an operation for producing an augmented reality image.

In an embodiment, when it is identified that all of one or more external electronic devices have no capability to produce an augmented reality image and a battery level of the electronic device 101 is smaller than a designated level, the electronic device 101 may receive supplemental information from a server 108 and display the received supplemental information through a display 420 without performing an operation for producing an augmented reality image. For example, a processor 460 may display, through a display 420, information on the weather of a location where the electronic device 101 is located, the information being received from a server 108. However, supplemental information displayed by a processor 460 is not limited to the above-described example.

Figure 7:
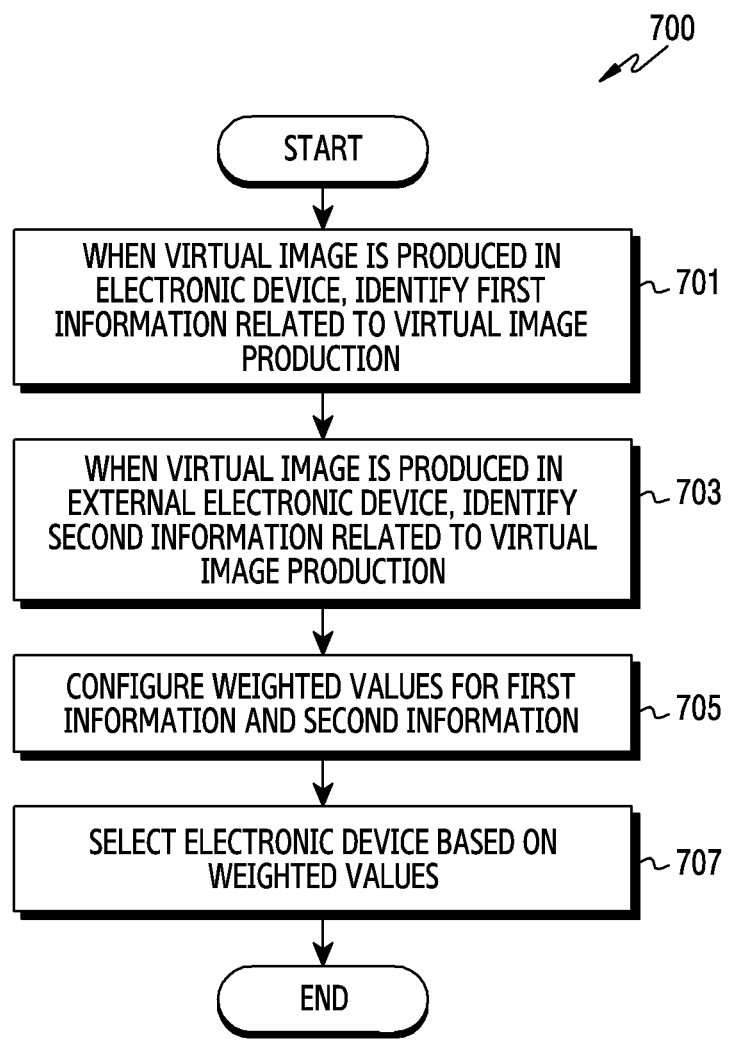
FIG. 7 is a flowchart for describing a method for configuring weighted values for a plurality of pieces of information to determine an electronic device for producing a virtual image related to an image, according to certain embodiments.

FIG. 7 is a flowchart 700 for describing a method for configuring weighted values for a plurality of pieces of information to determine an electronic device for producing a virtual image related to an image, according to certain embodiments.

In an embodiment, embodiments of operations performed in FIG. 7 are embodiments of operations related to operation 505 (or included in operation 505) of FIG. 5. In operation 701, in an embodiment, when a virtual image is produced in an electronic device 101 (or as predicted (or estimated) when an operation for producing a virtual image in the electronic device 101 is performed), a processor 460 may identify first information (or a first variable or a first condition) related to virtual image production. The processor 460 may identify at least one of a communication state between an electronic device 101 and a server 108, a present state of a battery of the electronic device 101, or the present temperature of the battery.

A processor 460 may identify (or predict) at least one of a consumed time, an electrical current amount consumed in the electronic device 101, or an increased temperature of the electronic device 101. A processor 460 may acquire, from a server 108, information on at least one of a consumed time, an electrical current amount consumed in the electronic device 101, or an increased temperature of the electronic device 101. However, a method for acquiring, by a processor 460, information on the at least one is not limited to the above-described example. A processor 460 may store acquired information in a table type in a memory 450.

In operation 703, in an embodiment, when a virtual image is produced in an external electronic device 102 (or as predicted (or estimated) when an operation for producing a virtual image in the external electronic device 102 is performed), a processor 460 may identify second information (or a second variable or a second condition) related to virtual image production.

A processor 460 may identify a present communication state between an electronic device 101 and an external electronic device 102.

When an operation for producing a virtual image is performed in an external electronic device 102, a processor 460 may identify (or predict) at least one of a consumed time, an electrical current amount consumed in the electronic device 101, or an increased temperature of the electronic device 101.

When an operation for producing a virtual image is performed in an external electronic device 102, a consumed time may include a time obtained by adding up a time of transmitting, to the external electronic device 102, information (for example: information on an external object and information on the position and the orientation of the electronic device 101) required to produce an augmented reality image, a time of producing, by the external electronic device 102, an augmented reality image, and a time of receiving, from the external electronic device 102, an augmented reality image.

In an embodiment, when an operation for producing a virtual image is performed in an external electronic device 102, an electrical current amount consumed in an electronic device 101 may include an electrical current amount to be consumed to transmit information (for example: information on an external object and information on the position and the orientation of the electronic device 101) required to produce an augmented reality image in the external electronic device 102 and an electrical current amount to be consumed to receive an augmented reality image from the external electronic device 102.

In an embodiment, when an operation for producing a virtual image is performed in an external electronic device 102, an increased temperature (or heating amount) may include the temperature of an electronic device 101, the temperature being expected to increase when the electronic device 101 transmits, to the external electronic device 102, information (for example: information on an external object and information on the position and the orientation of the electronic device 101) required to produce an augmented reality image, and receives an augmented reality image from the external electronic device 102.

In an embodiment, when an operation for producing a virtual image is performed in an external electronic device 102, a processor 460 may acquire, from a server 108, information on at least one of a consumed time, an electrical current amount consumed in an electronic device 101, or an increased temperature of the electronic device 101. However, a method for acquiring, by a processor 460, information on the at least one is not limited to the above-described example. A processor 460 may store acquired information in a table type in a memory 450.

In operation 705, in an embodiment, a processor 460 may configure weighted values for first information and second information.

In an embodiment, a processor 460 may configure a high weighted value for a present communication state (for example: a present communication state between an electronic device 101 and a server 108 and a present communication state between the electronic device 101 and an external electronic device 102), compared to other information.

In an embodiment, a processor 460 may configure a high weighted value for a present state of a battery of an electronic device 101 or the present temperature of the electronic device 101, compared to other information.

In an embodiment, a processor 460 may configure a high weighted value for information on at least one of a consumed time, an electrical current amount consumed in an electronic device 101, or an increased temperature of the electronic device 101 when an operation for producing a virtual image is performed in each of the electronic device 101 and an external electronic device 102, compared to other information.

In an embodiment, at least partially based on a state of an electronic device 101 or a situation of the electronic device 101, a processor 460 may configure (or change or adjust) weighted values for first information and second information.

In an embodiment, when an electronic device 101 is performing a charging operation, a processor 460 may configure a low weighted value (or change or adjust a weighted value to a low value) for an electrical current amount consumed when an operation for producing a virtual image is performed in each of the electronic device 101 and an external electronic device 102, and may configure a high weighted value for an increased temperature of the electronic device 101 when an operation for producing a virtual image is performed in each of the electronic device 101 and the external electronic device 102.

In an embodiment, when a battery level of an electronic device 101 is equal to or smaller than a designated level, a processor 460 may configure a high weighted value (or change or adjust a weighted value to a high value) for an electrical current amount consumed when an operation for producing a virtual image is performed in each of the electronic device 101 and an external electronic device 102, and may configure a low weighted value for a time consumed when an operation for producing a virtual image is performed in each of the electronic device 101 and the external electronic device 102.

However, a method for configuring, at least partially based on a state of an electronic device 101 or a situation of the electronic device 101, weighted values for first information and second information by a processor 460 is not limited to the above-described examples.

In an embodiment, at least partially based on a user input, a processor 460 may configure (or change or adjust) weighted values for first information and second information.

In operation 707, selection of the electronic device is based on the weighted values. At least partially based on first information and second information, for which weighted values have been configured, a processor 460 may determine, from among an electronic device 101 and an external electronic device 102, a utilized electronic device for producing a virtual image related to an image.

In an embodiment, at least partially based on the value of first information added up in consideration of a weighted value and the value of second information added up in consideration of a weighted value, a processor 460 may determine, from among an electronic device 101 and an external electronic device 102, a utilized electronic device for producing a virtual image related to an image.

In an embodiment, when the value of first information added up in consideration of a weighted value is equal to or smaller than the value of second information added up in consideration of a weighted value, a processor 460 may determine, as a utilized electronic device, an electronic device 101 for producing a virtual image related to an image from among the electronic device 101 and an external electronic device 102. When the value of first information added up in consideration of a weighted value is larger than the value of second information added up in consideration of a weighted value, a processor 460 may determine an electronic device for producing a virtual image related to an image as an external electronic device 102 from among an electronic device 101 and the external electronic device 102.

Figure 8:
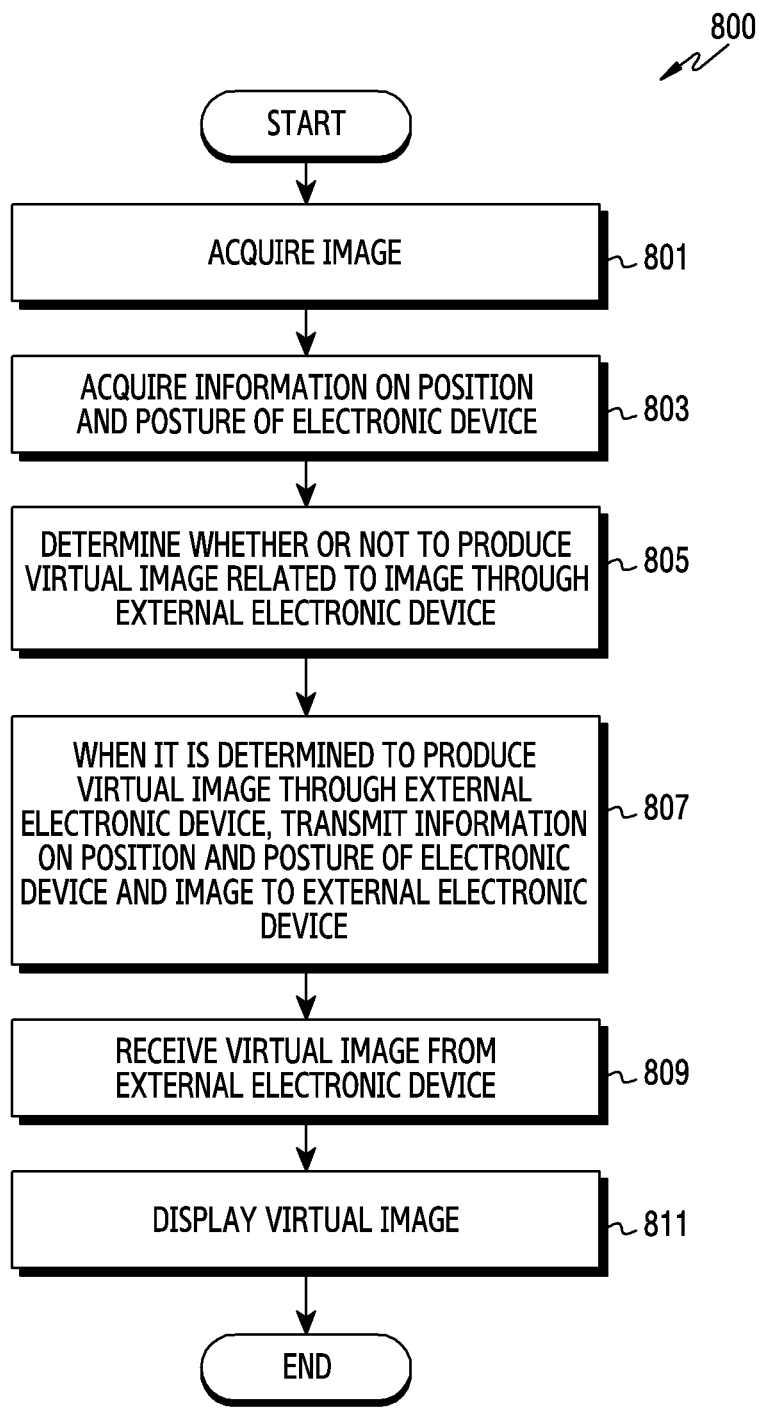
FIG. 8 is a flowchart for describing a method for processing data to provide an augmented reality service in an electronic device incapable of producing a virtual image, according to certain embodiments.

FIG. 8 is a flowchart 800 for describing a method for processing data to provide an augmented reality service in an electronic device 101 incapable of producing a virtual image, according to certain embodiments.

In FIG. 8, a description will be made under the assumption that: the electronic device 101 is an HMD device which may provide an augmented reality service in a see-through manner; the electronic device 101 is an electronic device which may not perform an operation for producing an augmented reality image (or have not capability to perform an operation for producing an augmented reality image); and an external electronic device 102 is an electronic device which may perform an operation for producing an augmented reality image.

Referring to FIG. 8, in operation 801, in an embodiment, a processor 460 may acquire an image.

In operation 803, in an embodiment, a processor 460 may acquire, through a sensor 440, information on the position and the orientation of the electronic device 101.

In an embodiment, embodiments of operation 801 and operation 803 are at least partially identical or similar to embodiments of operation 501 and operation 503 of FIG. 5, and thus a detailed description thereof will be omitted.

In operation 805, in an embodiment, a processor 460 may determine whether or not to produce a virtual image related to an image through an external electronic device 102.

In an embodiment, a processor 460 may request, to an external electronic device 102, for production of a virtual image, and determine whether or not to receive a virtual image from the external electronic device 102 or whether or not to receive supplemental information from a server 108.

In an embodiment, based on a communication state (for example: a state of (1-1)th wireless communication 310-1) between the electronic device 101 and an external electronic device 102 and a communication state (for example: a state of second wireless communication 320) between the electronic device 101 and a server 108, a processor 460 may determine whether or not to produce a virtual image related to an image through an external electronic device 102.

For example, a processor 460 may identify that a communication state between the electronic device 101 and an external electronic device 102 is better than a communication state between the electronic device 101 and a server 108. In response to identifying that a communication state between the electronic device 101 and an external electronic device 102 is better than a communication state between the electronic device 101 and a server 108, a processor 460 may determine to produce a virtual image related to an image through the external electronic device 102. In response to identifying that a communication state between the electronic device 101 and a server 108 is better than a communication state between the electronic device 101 and an external electronic device 102, a processor 460 may determine to receive supplemental information from the server 108.

In an embodiment, based on a state of a battery of the electronic device 101, a processor 460 may determine whether or not to produce a virtual image related to an image through an external electronic device 102. For example, when a remaining amount of a battery of the electronic device 101 is equal to or larger than a designated amount (or critical value), a processor 460 may determine to produce a virtual image related to an image through an external electronic device 102, if it is identified that a communication state between the electronic device 101 and the external electronic device 102 is better than a communication state between the electronic device 101 and a server 108. As another example, when a remaining amount of a battery of the electronic device 101 is smaller than a designated amount, a processor 460 may determine to receive supplemental information from a server 108, although it is identified that a communication state between the electronic device 101 and an external electronic device 102 is better than a communication state between the electronic device 101 and the server 108.

In an embodiment, based on a time consumed when an operation for producing an augmented reality image is performed in each of the electronic device 101 and an external electronic device 102, a processor 460 may determine whether or not to produce a virtual image related to an image through the external electronic device 102.

In an embodiment, a processor 460 may determine (or estimate) a time to be consumed when an operation for producing an augmented reality image is performed in an external electronic device 102. For example, a processor 460 may determine a time obtained by adding up a time of transmitting, to an external electronic device 102, information (for example: information on an external object and information on the position and the orientation of the electronic device 101) required to produce an augmented reality image, a time of producing, by the external electronic device 102, an augmented reality image, and a time of receiving, from the external electronic device 102, an augmented reality image.

In an embodiment, when a time consumed when an operation for producing an augmented reality image is performed in an external electronic device 102 is equal to or larger than a designated time, a processor 460 may determine to receive supplemental information from a server 108. In an embodiment, when a time consumed when an operation for producing an augmented reality image is performed in an external electronic device 102 is smaller than a designated time, a processor 460 may determine to produce a virtual image related to an image through the external electronic device 102.

In an embodiment, based on power (or an electrical current) consumed in the electronic device 101 when an operation for producing an augmented reality image is performed in an external electronic device 102, a processor 460 may determine whether or not to produce a virtual image related to an image through the external electronic device 102.

In an embodiment, a processor 460 may determine power obtained by adding up power to be consumed to transmit information (for example: information on an external object and information on the position and the orientation of the electronic device 101) required to produce an augmented reality image in an external electronic device 102 and power to be consumed to receive an augmented reality image from the external electronic device 102. In an embodiment, when the sum of power is equal to or larger than designated power, a processor 460 may determine to receive supplemental information from a server 108. When the sum of power is smaller than designated power, a processor 460 may determine to produce a virtual image related to an image through an external electronic device 102.

In an embodiment, based on a temperature (or a heating amount) increased in the electronic device 101 when an operation for producing an augmented reality image is performed in an external electronic device 102, a processor 460 may determine whether or not to produce a virtual image related to an image through an external electronic device 102.

In an embodiment, when the electronic device 101 transmits, to an external electronic device 102, information (for example: information on an external object and information on the position and the orientation of the electronic device 101) required to produce an augmented reality image, and receives an augmented reality image from the external electronic device 102, a processor 460 may determine the temperature of the electronic device 101, the temperature being expected to increase.

In an embodiment, when the temperature of the electronic device 101, the temperature being expected to increase when an operation for producing an augmented reality image is performed in an external electronic device 102, is equal to or larger than a designated temperature, a processor 460 may determine to receive supplemental information from a server 108. When the temperature of the electronic device 101, the temperature being expected to increase when an operation for producing an augmented reality image is performed in an external electronic device 102, is smaller than a designated temperature, a processor 460 may determine to produce a virtual image related to an image through the external electronic device 102.

In an embodiment, at least partially based on a communication state, a state of a battery of the electronic device 101, a consumed time, consumed electrical current amount, or increased temperature required to perform an operation for producing an augmented reality image in an external electronic device 102, or a combination thereof, a processor 460 may determine whether or not to produce a virtual image related to an image through the external electronic device 102.

In an embodiment, when whether or not to produce a virtual image related to an image through an external electronic device 102 is determined based on a plurality of pieces of information (or variables or conditions) from among a communication state, a state of a battery of the electronic device 101, and a consumed time, consumed electrical current amount, or increased temperature required to perform an operation for producing an augmented reality image in the external electronic device 102, a processor 460 may configure (or impart) a weighted value for (or to) each of the plurality of pieces of information. An operation of configuring a weighted value for each of a plurality of information is at least partially identical or similar to the method described in FIG. 7, and thus a detailed description thereof will be omitted.

In operation 807, in an embodiment, when an external electronic device 102 is determined as a utilized electronic device for producing a virtual image, a processor 460 may transmit, through a communication circuitry 410, information on the position and the orientation of the electronic device 101, and an image to the external electronic device 102.

In an embodiment, operation 807 is at least partially identical or similar to operation 507 of FIG. 5, and thus a detailed description thereof will be omitted.

In operation 809, in an embodiment, a processor 460 may receive, through a communication circuitry 410, a virtual image (or an augmented reality image) from an external electronic device 102.

In an embodiment, embodiments of operation 809 are at least partially identical or similar to embodiments of operation 509 of FIG. 5, and thus a detailed description thereof will be omitted.

In operation 811, in an embodiment, a processor 460 may display, through a display 420, a virtual image received through a communication circuitry 410.

In an embodiment, embodiments of operation 811 are at least partially identical or similar to embodiments of operation 511 of FIG. 5, and thus a detailed description thereof will be omitted.

Although not illustrated in FIG. 8, in an embodiment, in operation 805, when it is determined for a processor 460 to receive supplemental information from a server 108, the processor 460 may receive supplemental information from the server 108. A processor 460 may display, through a display 420, supplemental information received from a server 108.

Figure 9:
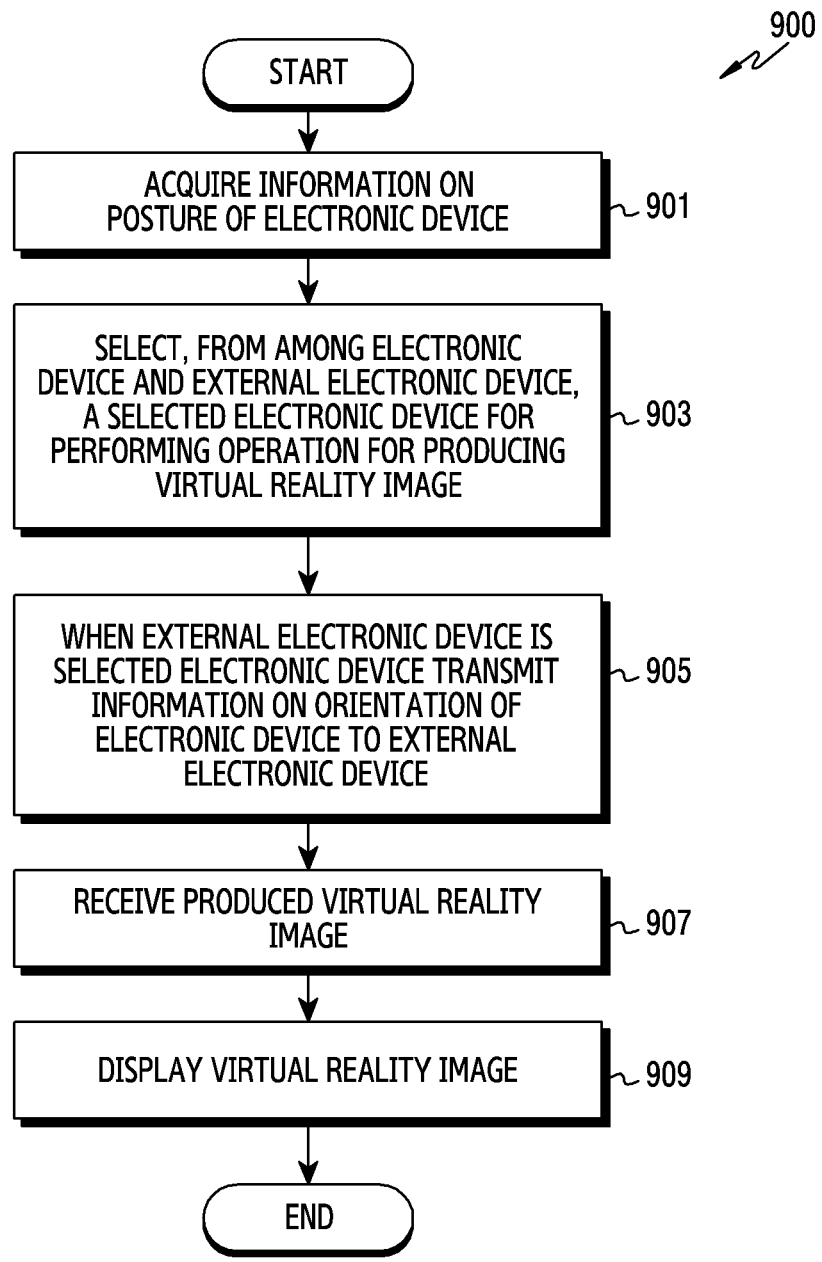
FIG. 9 is a flowchart for describing a method for processing data to provide a virtual reality service in an electronic device, according to certain embodiments.

FIG. 9 is a flowchart 900 for describing a method for processing data to provide a virtual reality service in an electronic device 101, according to certain embodiments.

In FIG. 9, a description will be made under the assumption that the electronic device 101 is an HMD device which may provide a virtual reality service, and that the electronic device 101 and an external electronic device 102 are electronic devices which may perform an operation for producing a virtual reality image (or have a capability to perform an operation for producing a virtual reality image).

In addition, a description will be made under the assumption that in order to perform an operation for producing a virtual reality image, the electronic device 101 or an external electronic device 102 receives, in real time (or in a streaming manner), content (for example: an omnidirectional image) required to produce a virtual reality image from a server 108.

Referring to FIG. 9, in operation 901, in an embodiment, a processor 460 may acquire information on the orientation of the electronic device 101 through a sensor 440.

In an embodiment, a processor 460 may acquire, from a motion sensor (or an inertial sensor), information on the orientation of the electronic device 101. In an embodiment, information on the orientation of the electronic device 101 may include information on a direction which the electronic device 101 faces and a degree in which the electronic device 101 is inclined. However, information on the orientation of the electronic device 101 is not limited to the above-described example. In an embodiment, a processor 460 may acquire, from a motion sensor 440, information on the orientation of the electronic device 101 in real time.

In operation 903, in an embodiment, a processor 460 may select from among the electronic device 101 and an external electronic device 102, a selected electronic device for producing a virtual reality image.

In an embodiment, based on a communication state (for example: a state of (1-1)th wireless communication 310-1) between the electronic device 101 and an external electronic device 102 and a communication state (for example: a state of second wireless communication 320) between the electronic device 101 and a server 108, a processor 460 may determine, from among the electronic device 101 and the external electronic device 102, a utilized electronic device for performing an operation for producing a virtual reality image.

For example, a processor 460 may identify that a communication state between the electronic device 101 and an external electronic device 102 is better than a communication state between the electronic device 101 and a server 108. In response to identifying that a communication state between the electronic device 101 and an external electronic device 102 is better than a communication state between the electronic device 101 and a server 108, a processor 460 may determine the external electronic device 102 as a utilized electronic device for performing an operation for producing a virtual reality image. In response to identifying that a communication state between the electronic device 101 and a server 108 is better than a communication state between the electronic device 101 and an external electronic device 102, a processor 460 may determine the electronic device 101 as a utilized electronic device for performing an operation for producing a virtual reality image.

In an embodiment, based on a communication state (for example: a state of (1-1)th wireless communication 310-1) between the electronic device 101 and an external electronic device 102, a communication state (for example: a state of (1-2)th wireless communication 310-2) between the external electronic device 102 and a server 108, and a communication state (for example: a state of second communication 320) between the electronic device 101 and the server 108, a processor 460 may determine, from among the electronic device 101 and the external electronic device 102, a utilized electronic device for performing an operation for producing a virtual reality image. For example, a processor 460 may identify a poor (or inferior) communication state from among a communication state between the electronic device 101 and an external electronic device 102 and a communication state between the external electronic device 102 and a server 108. In response to identifying that the poor communication state is better than a communication state between the electronic device 101 and the server 108, the processor 460 may determine the external electronic device 102 as a utilized electronic device for performing an operation for producing a virtual reality image. In response to identifying that the communication state between the electronic device 101 and the server 108 is better than the poor communication state, the processor 460 may determine the electronic device 101 as a utilized electronic device for performing an operation for producing a virtual reality image.

In an embodiment, a communication state may include the quality of a channel, received signal sensitivity, received signal strength indication, a transmission speed (a data rate), a signal to noise plus interference plus noise ratio (SINR), or a carrier to interference plus noise ratio (CINR). However, a communication state is not limited to the above-described example.

In an embodiment, communication between the electronic device 101 and an external electronic device may be P2P-type 5G network communication. In an embodiment, communication between the electronic device 101 and a server 108 may be 5G cellular network communication. However, communication between the electronic device 101 and an external electronic device 102 or a server 108 is not limited to the above-described example. For example, communication between the electronic device 101 and an external electronic device may include short-range wireless communication (for example: wireless gigabit alliance communication).

In an embodiment, based on a state of a battery of the electronic device 101, a processor 460 may determine, from among the electronic device 101 and an external electronic device 102, a utilized electronic device for performing an operation for producing an augmented reality image. For example, when a remaining amount of a battery of the electronic device 101 is equal to or larger than a designated amount (or critical value), a processor 460 may determine the electronic device 101 as a utilized electronic device for performing an operation for producing a virtual reality image, although it is identified that a communication state between the electronic device 101 and an external electronic device 102 is better than a communication state between the electronic device 101 and a server 108. As another example, when a remaining amount of a battery of the electronic device 101 is smaller than a designated amount, a processor 460 may determine an external electronic device 102 as a utilized electronic device for performing an operation for producing a virtual reality image, although it is identified that a communication state between the electronic device 101 and a server 108 is better than a communication state between the electronic device 101 and the external electronic device 102.

In an embodiment, based on a time consumed when an operation for producing a virtual reality image is performed in each of the electronic device 101 and an external electronic device 102, a processor 460 may determine, from among the electronic device 101 and the external electronic device 102, a utilized electronic device for performing an operation for producing a virtual reality image.

In an embodiment, a processor 460 may determine (or estimate) a time to be consumed when an operation for producing a virtual reality image is performed in the electronic device 101. In an embodiment, a processor 460 may determine (or estimate) a time to be consumed when an operation for producing a virtual reality image is performed in an external electronic device 102. For example, a processor 460 may determine a time obtained by adding up a time of transmitting, to an external electronic device 102, information (for example: information on the orientation of the electronic device 101) required to perform an operation for producing a virtual reality image, a time of producing, by the external electronic device 102, a virtual reality image, and a time of receiving, from the external electronic device 102, a virtual reality image.

In an embodiment, a processor 460 may determine, as a utilized electronic device for performing an operation for producing a virtual reality image, the electronic device 101 from among the electronic device 101 and an external electronic device 102, the electronic device 101 consuming a small amount of time while performing an operation for producing a virtual reality image.

In an embodiment, based on power (or an electrical current) consumed in the electronic device 101 when an operation for producing a virtual reality image is performed in each of the electronic device 101 and an external electronic device 102, a processor 460 may determine, from among the electronic device 101 and the external electronic device 102, a utilized electronic device for performing an operation for producing a virtual reality image.

In an embodiment, a processor 460 may determine (or estimate) power to be consumed when an operation for producing a virtual reality image is performed in the electronic device 101. In an embodiment, a processor 460 may determine power obtained by adding up power to be consumed to transmit information (for example: information on the orientation of the electronic device 101) required to produce a virtual reality image in an external electronic device 102 and power to be consumed to receive a virtual reality image from the external electronic device 102. In an embodiment, when power to be consumed when an operation for producing a virtual reality image is performed in the electronic device 101 is larger than the sum of power, a processor 460 may determine an external electronic device 102 as a utilized electronic device for performing an operation for producing a virtual reality image. When power to be consumed when an operation for producing a virtual reality image is performed in the electronic device 101 is equal to or smaller than the sum of power, a processor 460 may determine the electronic device 101 as a utilized electronic device for performing an operation for producing a virtual reality image.

In an embodiment, based on a temperature (or a heating amount) increased in the electronic device 101 when an operation for producing a virtual reality image is performed in each of the electronic device 101 and an external electronic device 102, a processor 460 may determine, from among the electronic device 101 and the external electronic device 102, an operation for producing a virtual reality image.

In an embodiment, a processor 460 may determine (or estimate) the temperature of the electronic device 101, the temperature being expected to increase when an operation for producing a virtual reality image is performed in the electronic device 101. In an embodiment, when the electronic device 101 transmits, to an external electronic device 102, information (for example: information on the orientation of the electronic device 101) required to produce a virtual reality image, and receives a virtual reality image from the external electronic device 102, a processor 460 may determine the temperature of the electronic device 101, the temperature being expected to increase.

In an embodiment, when the temperature of the electronic device 101, the temperature being expected to increase when an operation for producing a virtual reality image is performed in the electronic device 101, is larger than the temperature of the electronic device 101, the temperature being expected to increase when an operation for producing a virtual reality image is performed in an external electronic device 102, a processor 460 may determine the external electronic device 102 as a utilized electronic device for performing an operation for producing a virtual reality image. When the temperature of the electronic device 101, the temperature being expected to increase when an operation for producing a virtual reality image is performed in the electronic device 101, is equal to or smaller than the temperature of the electronic device 101, the temperature being expected to increase when an operation for producing a virtual reality image is performed in an external electronic device 102, a processor 460 may determine the electronic device 101 as a utilized electronic device for performing an operation for producing a virtual reality image.

In an embodiment, at least partially based on a communication state, a state of a battery of the electronic device 101, a consumed time, consumed electrical current amount, or increased temperature required to perform an operation for producing a virtual reality image in each of the electronic device 101 and an external electronic device 102, or a combination thereof, a processor 460 may determine, from among the electronic device 101 and the external electronic device 102, a utilized electronic device for performing an operation for producing a virtual reality image.

In an embodiment, when, from among the electronic device 101 and an external electronic device 102, a utilized electronic device for performing an operation for producing a virtual reality image is determined based on a plurality of pieces of information (or variables or conditions) from among a communication state, a state of a battery of the electronic device 101, and a consumed time, consumed electrical current amount, or increased temperature required to perform an operation for producing a virtual reality image in each of the electronic device 101 and the external electronic device 102, a processor 460 may configure (or impart) a weighted value for (or to) each of the plurality of pieces of information. An operation of configuring a weighted value for each of a plurality of information is identical or similar to the embodiments described in FIG. 7, and thus a detailed description thereof will be omitted.

In an embodiment, FIG. 9 illustrates that embodiments of operation 901 are performed prior to embodiments of operation 903, but is not limited thereto. For example, embodiments of operation 903 may be performed after embodiments of operation 901 are performed, or may be performed concurrently therewith.

In an embodiment, although not illustrated in FIG. 9, before operation 903 is performed, a processor 460 may perform an operation of determining (or identifying or detecting), from among a plurality of external electronic devices 102 communicable with the electronic device 101, at least one external electronic device which may perform an operation for producing a virtual reality image. In an embodiment, when a processor 460 determines one or more external electronic devices which may perform an operation for producing a virtual reality image, the processor 460 may perform operations of operation 903 for each of the one or more external electronic devices. For example, when a processor 460 determines, from among a plurality of external electronic devices communicable with the electronic device 101, a first external electronic device and a second external electronic device which may perform an operation for producing a virtual reality image, the processor 460 may determine, from among the electronic device 101, the first external electronic device, and the second external electronic device, a utilized electronic device for producing a virtual reality image. An operation of determining, by a processor 460, from among a plurality of external electronic devices communicable with the electronic device 101, at least one external electronic device which may perform an operation for producing a virtual reality image is at least partially identical or similar to the description of FIG. 6, and thus a detailed description thereof will be omitted.

In an embodiment, although not illustrated in FIG. 9, before performing embodiments of operation 905 after performing embodiments of operation 903, a processor 460 may connect, through a communication circuitry 410, the electronic device 101 and an external electronic device 102 to each other. However, a connection sequence is not limited thereto, and a processor 460 may perform operation 903 after the electronic device 101 and an external electronic device 102 are connected to each other.

In operation 905, in an embodiment, when an external electronic device 102 is the selected electronic device for producing a virtual reality image, a processor 460 may transmit, through a communication circuitry 410, information on the orientation of the electronic device 101 to the external electronic device 102.

For example, a processor 460 may connect, through a communication circuitry 410, the electronic device 101 and an external electronic device 102 to each other by using a P2P-type 5G network communication scheme. As another example, a processor 460 may connect, through a communication circuitry 410, the electronic device 101 and an external electronic device 102 by using a short-range communication module. However, a method for connecting, by a processor 460, the electronic device 101 and an external electronic device 102 to each other is not limited to the above-described examples. A processor 460 may transmit, to an external electronic device 102 through a communication circuitry 410, information on the orientation of the electronic device 101, the information being acquired by performing operation 901.

In operation 907, in an embodiment, a processor 460 may receive, through a communication circuitry 410.

Although not illustrated in FIG. 9, in an embodiment, in response to receiving information on the orientation of the electronic device 101 from the electronic device 101, an external electronic device 102 may perform an operation for producing a virtual reality image. In an embodiment, an external electronic device 102 may receive, in real time (or in a streaming manner), content (for example: an omnidirectional image) required to produce a virtual reality image from a server 108. At least partially based on content received from a server 108, an external electronic device 102 may produce a virtual reality image corresponding to the orientation of the electronic device 101. For example, an external electronic device 102 may determine, in an omnidirectional image received from a server 108, an image part corresponding to the orientation (for example: a field of view of a user) of the electronic device 101. An external electronic device 102 may produce a virtual reality image including an image part corresponding to the orientation of the electronic device 101. However, an operation for producing a virtual reality image, the operation being performed in response to receiving, by an external electronic device 102, information on the orientation of the electronic device 101 from the electronic device 101, is not limited to the above-described example.

In operation 909, in an embodiment, a processor 460 may display, through a display 420, a virtual reality image received through a communication circuitry 410.

In an embodiment, a processor 460 may display, through a display 420, a virtual reality image including an image part corresponding to the orientation of the electronic device 101.

In an embodiment, at least partially based on the orientation of the electronic device 101, a processor 460 may display, through a display 420, a virtual reality image, the orientation being changed while the electronic device 101 transmits, to an external electronic device 102, information on the orientation of the electronic device 101, and then receives the virtual reality image from the external electronic device 102 (hereinafter, referred to as "during a time in which an operation for producing a virtual reality image is performed"). In an embodiment, during a time in which an operation for producing a virtual reality image is performed, the orientation of the electronic device 101 may be changed. In an embodiment, a processor 460 may identify the orientation of the electronic device 101, the orientation being changed during a time in which an operation for producing a virtual reality image is performed, and may display, through a display 420, a virtual reality image, such that the virtual reality image corresponds to the changed orientation of the electronic device 101. In an embodiment, a processor 460 may determine, in consideration of a changed amount of the orientation of the electronic device 101, a display region of a virtual reality image. For example, a virtual reality image received from an external electronic device 102 may have a size larger than that of a region to be displayed through a display 420. A processor 460 may changes (or moves) the center of a virtual reality image received from an external electronic device 102, so as to correspond to a change in the orientation of the electronic device 101, and thus may determine (or crop) a region of the virtual reality image, the region being expected to be displayed through a display 420. A processor 460 may display, through a display 420, a determined region of a virtual reality image.

Although not illustrated in FIG. 9, in an embodiment, when a processor 460 determines the electronic device 101 as a utilized electronic device for producing a virtual reality image in embodiments of operation 903, the processor 460 may perform an operation for producing a virtual reality image. For example, through a communication circuitry 410, a processor 460 may receive, in real time, content required to produce a virtual reality image from a server 108. At least partially based on content received from a server 108, a processor 460 may produce a virtual reality image corresponding to the orientation of the electronic device 101. For example, a processor 460 may determine, in an omnidirectional image received from a server 108, an image part corresponding to the orientation (for example: a field of view of a user) of the electronic device 101. A processor 460 may produce a virtual reality image including an image part corresponding to the orientation of the electronic device 101. However, an operation for producing an augmented reality image, the operation being performed by a processor 460, is not limited to the above-described example. A processor 460 may perform an operation of, after a virtual reality image is produced, displaying the virtual reality image through a display 420 as pre-described in embodiments of operation 909.

In certain embodiments, a method comprises acquiring an image through a camera of an electronic device; acquiring, through a sensor of the electronic device, information on a position and a orientation of the electronic device; selecting, from among the electronic device and an external electronic device, a selected electronic device to produce a virtual image related to the image; when the selected electronic device is the external electronic device transmitting, through a communication circuitry of the electronic device, the information on the position and the orientation of the electronic device and the image to the external electronic device; receiving, through the communication circuitry, the virtual image from the external electronic device; and displaying the virtual image through a display of the electronic device.

In certain embodiments, the selecting from among the electronic device and the external electronic device, comprises: determining a first communication state between the electronic device and the external electronic device and a second communication state between the electronic device and a server for providing information required to perform an operation for producing the virtual image; and wherein selecting is at least partially based on the first communication state and the second communication state.

In certain embodiments, selecting from among the electronic device and the external electronic device, comprises: determining a first communication state between the electronic device and the external electronic device and a second communication state between the electronic device and a server for providing information required to produce the virtual image; determining a state of a battery of the electronic device; and wherein selecting is at least partially based on the first communication state, the second communication state, and the state of the battery of the electronic device.

In certain embodiments, the method further includes determining the temperature of the electronic device; and wherein selecting is at least partially based on the first communication state, the second communication state, the state of the battery of the electronic device, and the temperature of the electronic device.

In certain embodiments, the selecting from among the electronic device and the external electronic device, comprises: determining, in each of the electronic device and the external electronic device, at least one of a consumed time, consumed power, or a heating amount required when the virtual image is produced; and selecting from among the electronic device and the external electronic device is based on at least one of the consumed time, the consumed power, or the heating amount.

In certain embodiments, the method comprise configuring a weighted value for at least one of the consumed time, the consumed power, or the heating amount, wherein the selecting is based on the weighted value.

In certain embodiments, the method comprises determining at least one of the temperature of the electronic device or whether or not the electronic device performs a charging operation, and wherein the configuring of the weighted value comprises adjusting, based on at least one of the temperature of the electronic device or whether or not the electronic device performs a charging operation, the weighted value.

In certain methods, the method comprises selecting from among the electronic device and the external electronic device, further comprises: receiving, from one or more external electronic devices, information on a capability to perform an operation for producing the virtual image; and identifying, based on the received information on the capability, that the determined external electronic device has a capability to produce the virtual image.

In addition, a data structure used in the above-described embodiments may be recorded in a computer-readable recording medium through various means. The computer-readable recording medium includes storage mediums such as a magnetic storage medium (for example, a ROM, a floppy disk, and a hard disk) and an optical reading medium (for example, CD-ROM and DVD).

The disclosure has been discussed mainly with reference to preferable embodiments. Those skilled in the art to which the disclosure belongs may understand that the disclosure can be implemented in a modified form without departing from the essential characteristics of the disclosure. Therefore, the disclosed embodiments should be considered from a descriptive viewpoint, rather than from a restrictive viewpoint. The scope of the disclosure is represented in the following claims rather than in the foregoing description, and all differences within the scope equivalent thereto should be construed as being included in the scope of the disclosure.

What is claimed is:

1. An electronic device comprising:
   a communication circuitry;
   a camera;
   a display;
   a sensor; and
   at least one processor operably connected to the communication circuitry, the camera, the display, and the sensor, wherein the at least one processor is configured to:
   acquire an image through the camera;
   acquire, through the sensor, information on a position and an orientation of the electronic device;
   select one from among the electronic device and an external electronic device to produce a virtual image from the image based on a weighted value for at least one of a communication state, a battery state, a consumed power, a consumed time, or a heating state of the electronic device,
   wherein the weighted value is adjusted based on at least one of a temperature of the electronic device or whether or not the electronic device performs a charging operation, and
   wherein the electronic device and the external electronic device are capable of producing the image;
   when the external electronic device is selected:
     transmit, through the communication circuitry, the information on the position and the orientation of the electronic device and the image to the external electronic device;
     receive, through the communication circuitry, the virtual image produced by the external electronic device; and
     display the virtual image through the display; and
   when the electronic device is selected the automatically selected electronic device is the electronic device:
     produce the virtual image at the electronic device; and display the virtual image through the display using the information on the position and the orientation of the electronic device, and the image.

2. The electronic device of claim 1, wherein the communication state includes a first communication state and a second communication state, and
wherein the at least one processor is configured to:
determine the first communication state between the electronic device and the external electronic device and the second communication state between the electronic device and a server; and
wherein select from among the electronic device and the external electronic device is at least partially based on the first communication state and the second communication state.

3. The electronic device of claim 1, wherein the communication state includes a first communication state and a second communication state,
wherein the at least one processor is configured to:
determine the first communication state between the electronic device and the external electronic device and the second communication state between the electronic device and a server; and
determine the battery state of the electronic device; and
wherein select from among the electronic device and the external electronic device is at least partially based on the first communication state, the second communication state, and the battery state of the electronic device.

4. The electronic device of claim 3, wherein the at least one processor is configured to:
determine the temperature of the electronic device; and
wherein select from among the electronic device and the external electronic device is at least partially based on the first communication state, the second communication state, the battery state of the electronic device, and the temperature of the electronic device.

5. The electronic device of claim 1, wherein the at least one processor is configured to:
receive, from at least one external electronic device, information on a capability to produce the virtual image; and
identify, based on the received information on the capability, that the external electronic device has the capability to perform an operation for producing the virtual image.

6. The electronic device of claim 1, wherein the selected electronic device is selected based on the communication state between the electronic device and the external electronic device.

7. A method comprising:
acquiring an image through a camera of an electronic device;
acquiring, through a sensor of the electronic device, information on a position and an orientation of the electronic device;
selecting one from among the electronic device and an external electronic device to produce a virtual image from the image based on a weighted value for at least one of a communication state, a battery state, a consumed power, a consumed time, or a heating state of the electronic device,
wherein the weighted value is adjusted based on at least one of a temperature of the electronic device or whether or not the electronic device performs a charging operation, and
wherein the electronic device and the external electronic device are capable of producing the image;

when the external electronic device is selected:
transmitting, through a communication circuitry of the electronic device, the information on the position and the orientation of the electronic device and the image to the external electronic device;
receiving, through the communication circuitry, the virtual image produced by the external electronic device from the external electronic device; and
displaying the virtual image through a display of the electronic device; and
when the electronic device is selected:
produce the virtual image at the electronic device using the information on the position and the orientation of the electronic device, and the image; and
display the virtual image through the display.

8. The method of claim 7, wherein the communication state includes a first communication state and a second communication state,
wherein selecting one from among the electronic device and the external electronic device, comprises:
determining the first communication state between the electronic device and the external electronic device and the second communication state between the electronic device and a server for providing information required to perform an operation for producing the virtual image; and
wherein selecting is at least partially based on the first communication state and the second communication state.

9. The method of claim 7, wherein the communication state includes a first communication state and a second communication state,
wherein selecting from among the electronic device and the external electronic device, comprises:
determining the first communication state between the electronic device and the external electronic device and the second communication state between the electronic device and a server for providing information required to produce the virtual image;
determining the battery state of the electronic device; and
wherein selecting is at least partially based on the first communication state, the second communication state, and the battery state of the electronic device.

10. The method of claim 9, further comprising:
determining theft temperature of the electronic device; and
wherein selecting is at least partially based on the first communication state, the second communication state, the state of the battery state of the electronic device, and the temperature of the electronic device.

11. The method of claim 7, wherein the selecting from among the electronic device and the external electronic device, further comprises:
receiving, from one or more external electronic devices, information on a capability to perform an operation for producing the virtual image; and
identifying, based on the received information on the capability, that the selected external electronic device has a capability to produce the virtual image.

12. An electronic device comprising:
a communication circuitry;
a camera;
a display;
a sensor; and at least one processor operably connected to the communication circuitry, the camera, the display, and the sensor, wherein the at least one processor is configured to:

acquire an image through the camera, wherein the image includes a first depiction of an external object;

acquire, through the sensor, information on a position and an orientation of the electronic device;

determine whether or not to produce a virtual image from the image with an external electronic device connectable to the electronic device based on a weighted value for at least one of a communication state, a battery state, a consumed power, a consumed time, or a heating state of the electronic device;

when it is determined to produce the virtual image with the external electronic device transmit, through the communication circuitry, the information on the position and the orientation of the electronic device and the image to the external electronic device;

receive, through the communication circuitry, the virtual image from the external electronic device, wherein the virtual image includes a second depiction of the external object, and wherein the second depiction of the external object is based on the position and the orientation of the electronic device; and display the virtual image through the display, wherein the weighted value is adjusted based on at least one of a temperature of the electronic device or whether or not the electronic device performs a charging operation, and wherein the virtual image is produced by the external electronic device by determining a position that the virtual image is to be displayed on the display of the electronic device and mapping the external object to the position.

13. The electronic device of claim 12, wherein the communication state includes a first communication state and a second communication state, wherein the at least one processor is configured to:

identify the first communication state between the electronic device and the external electronic device and the second communication state between the electronic device and a server for providing information required to produce the virtual image; and determine whether or not to produce the virtual image by using the external electronic device at least partially based on the first communication state and the second communication state.

14. The electronic device of claim 12, wherein the communication state includes a first communication state and a second communication state, wherein the at least one processor is configured to:

identify the first communication state between the electronic device and the external electronic device and theft second communication state between the electronic device and a server for providing information required to produce the virtual image;

identify the battery state of the electronic device; and determine whether or not to produce the virtual image by using the external electronic device at least partially based on the first communication state, the second communication state, and the battery state of the electronic device.

* * * * *